United States Patent
Kim et al.

(10) Patent No.: US 12,143,739 B2
(45) Date of Patent: Nov. 12, 2024

(54) IMAGE SENSOR INCLUDING PIXEL ARRAY

(71) Applicant: Samsung Electronics Co., Ltd., Suwon-si (KR)

(72) Inventors: Yunhong Kim, Seoul (KR); Yunhwan Jung, Hwaseong-si (KR); Heesung Chae, Seoul (KR); Mooyoung Kim, Suwon-si (KR); Haesick Sul, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 177 days.

(21) Appl. No.: 17/857,812

(22) Filed: Jul. 5, 2022

(65) Prior Publication Data

US 2023/0011310 A1 Jan. 12, 2023

(30) Foreign Application Priority Data

Jul. 9, 2021 (KR) .................. 10-2021-0090545

(51) Int. Cl.
*H04N 25/75* (2023.01)
*H04N 25/63* (2023.01)
*H04N 25/633* (2023.01)

(52) U.S. Cl.
CPC ............. *H04N 25/75* (2023.01); *H04N 25/63* (2023.01); *H04N 25/633* (2023.01)

(58) Field of Classification Search
CPC ...... H04N 25/60; H04N 25/63; H04N 25/633; H04N 25/75; H04N 25/766; H04N 25/772; H04N 25/78
See application file for complete search history.

(56) References Cited

U.S. PATENT DOCUMENTS

| | | | |
|---|---|---|---|
| 6,522,355 B1 * | 2/2003 | Hynecek | H04N 25/63 348/E5.081 |
| 7,091,751 B2 | 8/2006 | Roh et al. | |
| 9,124,829 B2 | 9/2015 | Patel | |
| 9,197,233 B2 | 11/2015 | Gaalema et al. | |
| 9,537,501 B2 | 1/2017 | Lee et al. | |
| 10,347,676 B2 | 7/2019 | Hwangbo | |

(Continued)

FOREIGN PATENT DOCUMENTS

| | | |
|---|---|---|
| KR | 100594227 B1 | 7/2006 |
| KR | 100681667 B1 | 2/2007 |

(Continued)

*Primary Examiner* — Lin Ye
*Assistant Examiner* — Chriss S Yoder, III
(74) *Attorney, Agent, or Firm* — Harness, Dickey & Pierce, P.L.C.

(57) ABSTRACT

An image sensor may include a pixel array a pixel array including an active pixel and an optical black pixel, the active pixel configured to generate a first pixel signal, and the optical black pixel configured to generate a second pixel signal, a first biasing circuit configured to bias the first pixel signal based on a first bias voltage, a first analog-to-digital converter configured to convert the biased first pixel signal into a first digital signal, a second biasing circuit configured to bias the second pixel signal based on a second bias voltage, and a second analog-to-digital converter configured to convert the biased second pixel signal into a second digital signal, the second digital signal configured to generate smaller random noise than the first analog-to-digital converter.

20 Claims, 10 Drawing Sheets

(56) References Cited

U.S. PATENT DOCUMENTS

| | | | |
|---|---|---|---|
| 2014/0055176 A1 | 2/2014 | Zhang et al. | |
| 2015/0162925 A1* | 6/2015 | Lee | H03M 1/1295 |
| | | | 250/208.1 |
| 2017/0214868 A1* | 7/2017 | Yun | H04N 25/75 |

FOREIGN PATENT DOCUMENTS

| | | |
|---|---|---|
| KR | 2018/0103500 A | 9/2018 |
| KR | 102105409 B1 | 5/2020 |

* cited by examiner

IMAGE SENSOR INCLUDING PIXEL ARRAY

CROSS-REFERENCE TO RELATED APPLICATION

This U.S. non-provisional application is based on and claims the benefit of priority under 35 U.S.C. § 119 to Korean Patent Application No. 10-2021-0090545, filed on Jul. 9, 2021, in the Korean Intellectual Property Office, the disclosure of which is incorporated by reference herein in its entirety.

BACKGROUND

Various example embodiments of the inventive concepts relate to an image sensor, and more particularly, to an image sensor including a pixel array including an active pixel and an optical black pixel, biasing circuits respectively corresponding to the active pixel and the optical black pixel, and an analog-to-digital converter, a system including the image sensor, and/or a method of operating the image sensor, etc.

As a device for capturing an image, a complementary metal oxide semiconductor (CMOS) image sensor is widely used. A pixel array of the CMOS image sensor may include an active region including active pixels and an optical black region including optical black pixels. Pixel signals output to column lines of the active region and column lines of the optical black region may be converted into digital signals through an analog-to-digital conversion device (e.g., an analog-to-digital converter, etc.).

An analog pixel signal output from the pixel array may include random noise caused by pixel-unique characteristics, such as fixed pattern noise (FPN), and a digital pixel signal generated based on the analog pixel signal may include random noise caused by characteristics of the analog-to-digital conversion device arranged in each column of the pixel array. Therefore, the image data output from the CMOS image sensor includes horizontal noise, and thus, the image quality may be deteriorated, decreased, and/or reduced.

Generally, a digital signal of a column line of the active region may be corrected by subtracting an average value of digital signals output from the analog-to-digital conversion device connected to the column lines of the optical black region from the digital signal of the column line of the active region in order to remove the horizontal noise.

As the number of analog-to-digital conversion devices increases, horizontal noise of image data output from an image sensor may be accurately removed, but as the number of analog-to-digital conversion devices increases, a total physical size of the image sensor may increase and/or the cost of the image sensor may increase.

SUMMARY

Various example embodiments of the inventive concepts provide an image sensor that improves the quality of image data of the image sensor without increasing the number of analog-to-digital conversion devices connected to column lines in an optical black region.

According to at least one example embodiment of the inventive concepts, there is provided an image sensor including a pixel array including an active pixel and an optical black pixel, the active pixel configured to generate a first pixel signal, and the optical black pixel configured to generate a second pixel signal, a first biasing circuit configured to bias the first pixel signal based on a first bias voltage, a first analog-to-digital converter configured to convert the biased first pixel signal into a first digital signal, a second biasing circuit configured to bias the second pixel signal based on a second bias voltage, and a second analog-to-digital converter configured to convert the biased second pixel signal into a second digital signal, the second digital signal configured to generate smaller random noise than the first analog-to-digital converter.

According to at least one example embodiment of the inventive concepts, there is provided an image sensor including a pixel array including an active region and an optical black region, the active region including a plurality of active pixels arranged in a matrix, and the optical black region including a plurality of optical black pixels arranged in a matrix, a first biasing circuit connected to each column line of a plurality of column lines of the active region, and the first biasing circuit configured to bias a first pixel signal generated from at least one active pixel of the plurality of active pixels of a connected column line, a first analog-to-digital converter connected to each column line of the plurality of column lines of the active region, and the first analog-to-digital converter configured to convert the biased first pixel signal into a first digital signal, a second biasing circuit connected to each column line of a plurality of column lines of the optical black region, and the second biasing circuit configured to bias a second pixel signal generated from at least one of the plurality of optical black pixels of the connected column line, and a second analog-to-digital converter connected to each column line of the plurality of column lines of the optical black region, and the second analog-to-digital converter configured to convert the biased second pixel signal into a second digital signal, the second analog-to-digital converter further configured to generate less random noise less than the first analog-to-digital converter.

According to at least one example embodiment of the inventive concepts, there is provided an image sensor including a ramp signal generator configured to generate a ramp signal, a pixel array including an active region and an optical black region, the active region including a plurality of active pixels arranged in a matrix, and the optical black region including a plurality of optical black pixels arranged in a matrix, a first analog-to-digital converter connected to each column line of a plurality of column lines of the active region and the ramp signal generator, and the first analog-to-digital converter configured to convert at least one first pixel signal generated from at least one active pixel of the plurality of active pixels of a connected column line into at least one first digital signal, a second analog-to-digital converter connected to each column line of a plurality of column lines of the optical black region and the ramp signal generator, the second analog-to-digital converter configured to convert at least one second pixel signal generated from at least one optical black pixel of the plurality of optical black pixels of the connected column line into at least one second digital signal, the second analog-to-digital converter further configured to generate less random noise than the first analog-to-digital converter, a correction circuit configured to correct the first digital signal based on the second digital signal, and an output buffer configured to output the corrected first digital signal as image data.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts will be described in detail with reference to the accompanying drawings.

Figure 1:
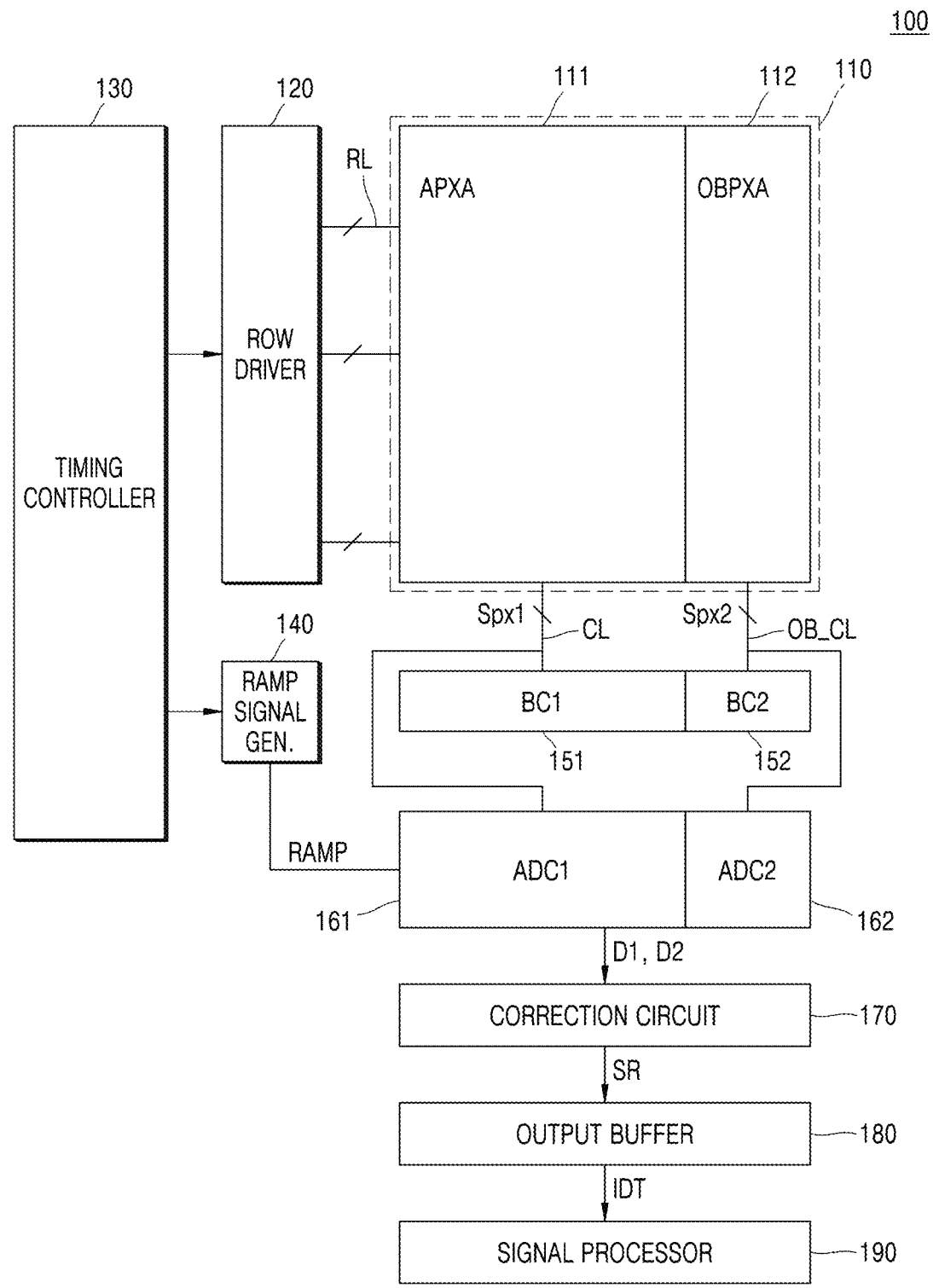
FIG. 1 is a block diagram showing an image sensor according to at least one example embodiment of the inventive concepts.

FIG. 1 is a block diagram showing an image sensor according to at least one example embodiment of the inventive concepts.

Referring to FIG. 1, an image sensor 100 according to at least one example embodiment of the inventive concepts may include a pixel array 110, a row driver 120, a timing controller 130, a ramp signal generator 140, a first biasing circuit 151, a second biasing circuit 152, a first analog-to-digital converter 161, a second analog-to-digital converter 162, a correction circuit 170, an output buffer 180, and/or a signal processor 190, etc., but the example embodiments are not limited thereto, and for example, may include a greater or lesser number of constituent components. In addition, the image sensor 100 may further include additional components for improving image sensing sensitivity, etc. According to some example embodiments, the row driver 120, timing controller 130, ramp signal generator 140, first biasing circuit 151, second biasing circuit 152, first analog-to-digital converter 161, second analog-to-digital converter 162, correction circuit 170, output buffer 180, and/or signal processor 190, etc., may be implemented as processing circuitry. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The image sensor 100 may be mounted in an electronic device having an image and/or light sensing function, but is not limited thereto. For example, the image sensor 100 may be mounted in an electronic device such a camera, a smartphone, a wearable device, an Internet of Things (IoT) device, a personal computer (PC), a laptop, a tablet, a personal digital assistant (PDA), a portable multimedia player (PMP), a navigation device, a drone, an advanced drivers assistance system (ADAS), a gaming console, a virtual reality and/or augmented reality device, and/or the like. Also, the image sensor 100 may be mounted in an electronic device that is provided as a component in vehicles, furniture, manufacturing facilities, doors, and/or various measuring devices, etc.

The pixel array 110 may include an active region 111 in which a plurality of active pixels are arranged in a matrix and an optical black region 112 in which a plurality of optical black pixels are arranged in a matrix.

The pixel array 110 may include a plurality of row lines, a plurality of column lines, and a plurality of pixels that are respectively connected to the row lines and the column lines and are arranged in a matrix-like form. A row line may include a plurality of lines for transmitting a row selection signal and/or a pixel control signal to a connected pixel, etc.

Each of the plurality of active pixels of the active region 111 may include a photosensitive device, and each of the plurality of active pixels may detect light using the photosensitive device, and convert the sensed light into at least one first pixel signal Spx1, which is an electrical signal corresponding to the sensed light. For example, the photosensitive device may include a photodiode, a phototransistor, a photo gate, a pinned photodiode (PPD), and/or a combination thereof. Each of a plurality of photosensitive devices may have a four-transistor structure including a photodiode, a transfer transistor, a reset transistor, an amplification transistor, and/or a selection transistor, etc., but are not limited thereto. According to at least one example embodiment, each photosensitive device of a plurality of photosensitive devices may have a one-transistor structure, a three-transistor structure, and/or a five-transistor structure, etc., and/or may have a structure in which a plurality of pixels share some transistors, etc.

Each of the plurality of optical black pixels of the optical black region 112 includes an upper portion covered with a metal, and light incident from the outside (e.g., external light, etc.) may be completely blocked. The optical black region 112 is hardly affected by incident light. Each of the plurality of optical black pixels may output at least one second pixel signal Spx2 based on electrons generated inside each optical black pixel of the plurality of optical black pixels.

The row driver 120 drives the pixel array 110 in units of rows. The row driver 120 may decode a row control signal provided from the timing controller 130, and may select at least one row among rows constituting the pixel array 110 in response to the decoded row control signal. For example, the row driver 120 may generate a row selection signal. A row selection signal and/or a pixel control signal for controlling a selected pixel may be provided to a pixel through a row line, etc.

Pixel signals are output from pixels of a row selected by the row selection signal provided by the row driver 120. The first pixel signal Spx1 and the second pixel signal Spx2 are output from each active pixel of the plurality of active pixels and each optical black pixel of the plurality of optical black pixels of the row selected by the row selection signal, but the example embodiments are not limited thereto. The first pixel signal Spx1 and the second pixel signal Spx2 may include a reset signal and/or an image signal, etc., but are not limited thereto. A voltage difference between the reset signal and the image signal may include information on (and/or correspond to, is based on, etc.) an amount of light received by each of a plurality of pixels.

The timing controller 130 may provide control signals and/or clock signals (CLK) respectively corresponding to components of the image sensor 100, for example, the row driver 120, the ramp signal generator 140, the first analog-to-digital converter 161, and/or the second analog-to-digital converter 162, etc., but are not limited thereto. The row driver 120, the ramp signal generator 140, the first analog-to-digital converter 161, and/or the second analog-to-digital converter 162, etc., may operate at a timing set for each of the components based on the control signals and/or the clock signals provided from the timing controller 130. For example, a counter included in each of the first analog-to-digital converter 161 and the second analog-to-digital converter 162 may receive a counting signal and/or a clock signal from the timing controller 130, but are not limited thereto. For example, the timing controller 130 may generate a control signal and output the control signal to the row driver 120, and may generate a ramp enable signal and output the ramp enable signal to the ramp signal generator 140, etc.

The ramp signal generator 140 may generate a ramp signal RAMP. The ramp signal generator 140 may operate based on a ramp control signal provided from the timing controller 130. The ramp control signal may include a ramp enable signal. When the ramp enable signal is activated, the ramp signal generator 140 may generate, for example, a ramp signal RAMP having a slope, etc. The ramp signal RAMP may be ramped up or ramped down while having a constant slope, but the example embodiments are not limited thereto.

The first biasing circuit 151 may be connected to an active pixel of the active region 111, but is not limited thereto. For example, the first biasing circuit 151 may be connected to each of a plurality of columns of the active region 111, but is not limited thereto. The first biasing circuit 151 may be connected to the active pixel to form a source follower, and may bias the first pixel signal Spx1 based on a first bias voltage, etc. The first pixel signal Spx1 biased by the first biasing circuit 151 may include noise of the first biasing circuit 151 (e.g., the first pixel signal Spx1 may include noise generated by, produced by, and/or introduced by the first biasing circuit 151, etc.).

The second biasing circuit 152 may be connected to an optical black pixel of the optical black region 112, but is not limited thereto. For example, the second biasing circuit 152 may be connected to each of a plurality of columns of the optical black region 112, etc. The second biasing circuit 152 may be connected to the optical black pixel to form a source follower, and may bias the second pixel signal Spx2 based on a second bias voltage. The second pixel signal Spx2 biased by the second biasing circuit 152 may include noise of the second biasing circuit 152 (e.g., the second pixel signal Spx2 may include noise generated by, produced by, and/or introduced by the second biasing circuit 152, etc.). For example, the biased second pixel signal Spx2 may include random noise smaller than that of the biased first pixel signal Spx1, but the example embodiments are not limited thereto. Hereinafter, the second pixel signal Spx2 and the first pixel signal Spx1 may include the biased second pixel signal Spx2 and the biased first pixel signal Spx1.

The first analog-to-digital converter 161 receives the plurality of first pixel signals Spx1 that are analog signals output from active pixels of a selected row, and converts the received first pixel signals Spx1 into a plurality of first digital signals D1. The first analog-to-digital converter 161 may be connected to an active pixel of the active region 111, but is not limited thereto. The first analog-to-digital converter 161 may be connected to each of a plurality of columns of the active region 111, etc. The first digital signals D1 generated by the first analog-to-digital converter 161 connected to each of the plurality of columns are output to the correction circuit 170.

The second analog-to-digital converter 162 receives the plurality of second pixel signals Spx2 that are analog signals output from optical black pixels of a selected row, and converts the received second pixel signals Spx2 into a plurality of second digital signals D2. The second analog-to-digital converter 162 may be connected to an optical black pixel of the optical black region 112, but is not limited thereto. The second analog-to-digital converter 162 may be connected to each of a plurality of columns of the optical black region 112, etc. The second digital signals D2 generated by the second analog-to-digital converter 162 connected to each of the plurality of columns of the optical black region 112 are output to the correction circuit 170.

In at least one example embodiment, random noise of the second analog-to-digital converter 162 may be smaller than random noise of the first analog-to-digital converter 161, but is not limited thereto. As the number of second analog-to-digital converters 162 connected to an optical black pixel increases, horizontal noise of image data IDT output from the image sensor 100 may be accurately removed, and when the number of second analog-to-digital converters 162 increases, a total size (e.g., a total physical size and/or physical area) of the image sensor 100 may increase. When the second analog-to-digital converter 162 of at least one example embodiment which generates low noise and/or reduced noise (and/or lower noise and/or reduced noise than conventional analog-to-digital converters) is implemented, the same effect as that of increasing the number of conventional second analog-to-digital converters may be obtained. When the random noise generated, produced, and/or introduced by the second analog-to-digital converter 162 is smaller than the random noise generated, produced, and/or introduced by the first analog-to-digital converter 161, the second analog-to-digital converter 162 may be considered to be implemented with low noise and/or reduced noise.

Each of the first analog-to-digital converter 161 and the second analog-to-digital converter 162 may use a correlated double sampling (CDS) method to convert a voltage level of a pixel into a digital code, but the example embodiments are not limited thereto. The CDS method is widely used to detect only a desired signal component, for example, by removing easily observable fixed pattern noise (FPN) from a signal output from a unit pixel of the image sensor 100. The CDS method contributes to significantly reduce noise caused by a characteristic difference between FPN fundamentally in each of unit pixels and the unit pixels by using a difference between a reset signal maintaining a constant voltage level and an image signal corresponding to an optical signal detected by a unit pixel.

The first analog-to-digital converter 161 and the second analog-to-digital converter 162 according to some example embodiments will be described in further detail in connection with FIGS. 4 and 5.

The correction circuit 170 may receive a first digital signal D1 from the first analog-to-digital converter 161, and may receive a second digital signal D2 from the second analog-to-digital converter 162, but is not limited thereto. The correction circuit 170 may correct the first digital signal D1 based on the second digital signal D2, but is not limited thereto.

The correction circuit 170 may correct each of the first digital signals D1 using an average of the plurality of second digital signals D2 generated by the second analog-to-digital converter 162 connected to each column of the optical black region 112 in the same row. The correction circuit 170 may output a correction signal SR to the output buffer 180 by correcting the first digital signal D1.

The output buffer 180 may temporarily store, amplify, and then output an image data IDT based on the correction signal SR received from the correction circuit 170. The correction signal SR may refer to the first digital signal D1 corrected by the correction circuit 170. The output buffer 180 may include a plurality of memories (not shown) and/or a sense amplifier (not shown), but is not limited thereto. Each of the plurality of memories may temporarily store correction signals SR output from the correction circuit 170, and then sequentially and/or optionally output the correction signals SR to the sense amplifier, and the sense amplifier may sense, amplify, and output the received correction signal SR. The sense amplifier may output the amplified correction signals SR as the image data IDT.

The signal processor 190 may receive an input of the image data IDT, which is an output signal of the output buffer 180, and may process an image (e.g, process the image data IDT, etc.) and output the processed image to the outside (e.g., an external destination, etc.) of the image sensor 100. For example, the signal processor 190 may output the processed image to a display, a computer, a network device, etc. Alternatively, the signal processor 190 may receive a control signal from an external host through PC I/F, and may provide the processed image to the external host. Although FIG. 1 shows that the signal processor 190 is located in the image sensor 100, the inventive concepts is not limited thereto, and the signal processor 190 may be located outside the image sensor 100.

Figure 2:
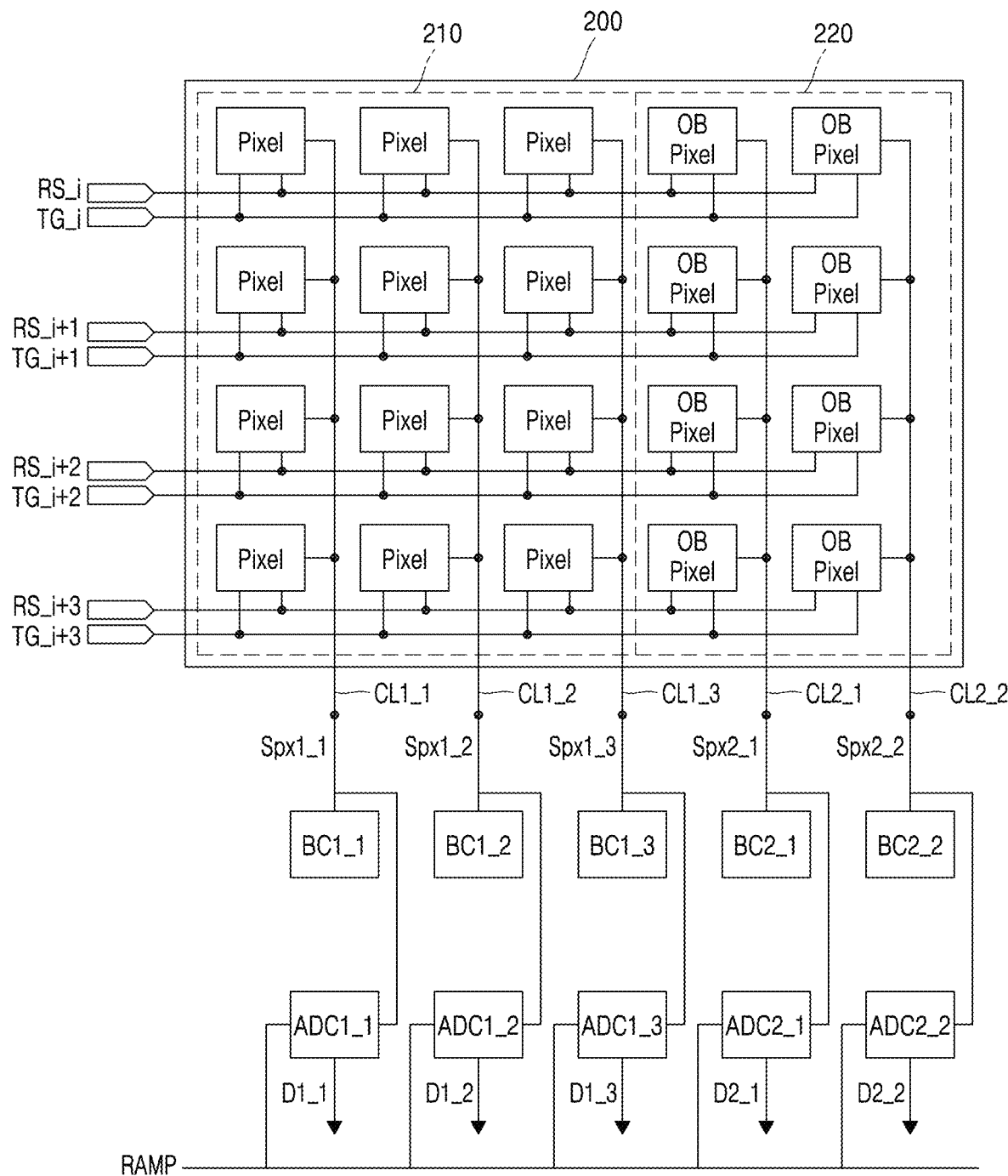
FIG. 2 is a diagram for explaining a pixel array, a biasing circuit, and an analog-to-digital converter, according to at least one example embodiment of the inventive concepts.

FIG. 2 is a diagram for explaining a pixel array, a biasing circuit, and an analog-to-digital converter, according to at least one example embodiment of the inventive concepts.

Referring to FIG. 2, a pixel array 200 may include an active region 210 and an optical black region 220. An analog-to-digital converter may be a column parallel analog-to-digital converter, but the example embodiments are not limited thereto. Hereinafter, detailed description of components that are the same as given above are omitted.

The active region 210 may include a plurality of active pixels arranged in a matrix. Each of the plurality of active pixels may detect light using a photoelectric conversion device, convert the light into an electrical signal, and output the electrical signal through a plurality of column lines, e.g., CL1_1, CL1_2, and/or CL1_3, etc., but the example embodiments are not limited thereto. The plurality of column lines, e.g., CL1_1, CL1_2, and CL1_3, may output a plurality of first pixel signals, e.g., Spx1_1, Spx1_2, and/or Spx1_3, etc., respectively. For example, the column line CL1_1 may output the first pixel signal Spx1_1, etc.

The optical black region 220 may include a plurality of optical black pixels OB Pixel arranged in a matrix. Each of the plurality of optical black pixels OB Pixel may perform a conversion into an electrical signal based on electrons generated inside each of the plurality of optical black pixels OB Pixel, and output the electrical signal through a plurality of column lines, e.g., CL2_1 and/or CL2_2, etc. The plurality of column lines, e.g., CL2_1 and CL2_2, etc., may output a plurality of second pixel signals, e.g., Spx2_1 and/or Spx2_2, etc., respectively, but the example embodiments are not limited thereto. For example, the column line CL2_1 may output the second pixel signal Spx2_1, etc. Although FIG. 2 shows that the number of column lines included in the active region 210 is three and the number of column lines included in the optical black region 220 is two, the number of column lines included in each of the active region 210 and the optical black region 220 are not necessarily limited thereto, and may be greater than or less than the number of column lines shown in FIG. 2.

The pixel array 200 may be driven in units of rows. The plurality of first pixel signals, e.g., Spx1_1, Spx1_2, and/or Spx1_3, etc., and the plurality of second pixel signals, e.g., Spx2_1 and/or Spx2_2, etc., may be output from one or more active pixels Pixel of a row selected by a row selection signal provided from a row driver (for example, the row driver 120 of FIG. 1) and the optical black pixels OB Pixel, respectively, but the example embodiments are not limited thereto.

During the sampling operation of the pixel signals using the CDS method, when a reset signal RS_i and a transfer signal TG_i are provided to a selected row in the pixel array 200, the first and second pixel signals, e.g., Spx1_1, Spx1_2, Spx1_3, Spx2_1, and Spx2_2, etc., corresponding to each of the reset signal RS_i and the transfer signal TG_i may be output to the plurality of column lines, e.g., CL1_1, CL1_2, CL1_3, CL2_1, and CL2_2, etc., of the selected row, but the example embodiments are not limited thereto.

The plurality of column lines, e.g., CL1_1, CL1_2, and/or CL1_3, etc., of the active region 210 may be connected to a plurality of first biasing circuits, e.g., BC1_1, BC1_2, and/or BC1_3, etc., respectively, but the example embodiments are not limited thereto. For example, the column line CL1_1 may be connected to the first biasing circuit BC1_1, the column line CL1_2 may be connected to the first biasing circuit BC1_2, and/or the column line CL1_3 may be connected to the first biasing circuit BC1_3, but the example embodiments are not limited thereto.

The plurality of first biasing circuits, e.g., BC1_1, BC1_2, and/or BC1_3, etc., may bias the plurality of first pixel signals, e.g., Spx1_1, Spx1_2, and/or Spx1_3, etc., generated from at least one of the plurality of active pixels Pixel of a column line connected to the plurality of first biasing circuits, e.g., BC1_1, BC1_2, and/or BC1_3, etc. For example, the first biasing circuit BC1_1 of a selected row may bias the first pixel signal Spx1_1 generated from an active pixel Pixel of the column line CL1_1, but is not limited thereto. The first pixel signal Spx1_1 may be biased according to the first bias voltage, and the biased first pixel signal Spx1_1 may be input to a first analog-to-digital converter ADC1_1. The first bias voltage is a bias voltage of the plurality of first biasing circuits, e.g., BC1_1, BC1_2, and BC1_3, etc., and the first bias voltage of each of the plurality of first biasing circuits, e.g., BC1_1, BC1_2, and BC1_3, etc., may be the same or different.

The plurality of column lines, e.g., CL2_1 and CL2_2, etc., of the optical black region 220 may be connected to the plurality of second biasing circuits, e.g., BC2_1 and BC2_2, etc., respectively. For example, the column line CL2_1 may be connected to the second biasing circuit BC2_1, and the column line CL2_2 may be connected to the second biasing circuit BC2_2, but are not limited thereto.

The second biasing circuits, e.g., BC2_1 and BC2_2 may bias the second pixel signals, e.g., Spx2_1 and Spx2_2, etc., generated from at least one of the plurality of optical black pixels OB Pixel of a column line connected to the second biasing circuits, e.g., BC2_1 and BC2_2, etc. For example, the second biasing circuit BC2_1 of a selected row may bias the second pixel signal Spx2_1 generated from an optical black pixel OB pixel of the column line CL2_1, but is not limited thereto. The second pixel signal Spx2_1 may be biased according to the second bias voltage, and the biased second pixel signal Spx2_1 may be input to a second analog-to-digital converter ADC2_1. The second bias voltage is a bias voltage of the second biasing circuits, e.g., BC2_1 and BC2_2, etc., and the bias voltage of each of the second biasing circuits, e.g., BC2_1 and BC2_2, etc., may be the same or different.

The plurality of column lines, e.g., CL1_1, CL1_2, and CL1_3, etc., of the active region 210 may be connected to first analog-to-digital converters, e.g., ADC1_1, ADC1_2, and ADC1_3, etc., respectively. For example, the column line CL1_1 may be connected to the first analog-to-digital converter ADC1_1, the column line CL1_2 may be connected to the first analog-to-digital converter ADC1_2, and the column line CL1_3 may be connected to the first analog-to-digital converter ADC1_3, but the example embodiments are not limited thereto.

The plurality of first analog-to-digital converters, e.g., ADC1_1, ADC1_2, and ADC1_3, etc., may convert the plurality of biased first pixel signals, e.g., Spx1_1, Spx1_2, and Spx1_3, etc., into a plurality of first digital signals D1_1, D1_2, and D1_3, etc. The first analog-to-digital converters ADC1_1, ADC1_2, and ADC1_3, etc., may convert the biased first pixel signals Spx1_1, Spx1_2, and Spx1_3, etc., output through the column line connected to the first analog-to-digital converters ADC1_1, ADC1_2, and ADC1_3, etc., into the first digital signals D1_1, D1_2, and D1_3, etc. For example, the first analog-to-digital converter ADC1_1 of a selected row may convert the first pixel signal Spx1_1 into the first digital signal D1_1, etc., but the example embodiments are not limited thereto. The first analog-to-digital converters ADC1_1, ADC1_2, and ADC1_3, etc., may convert the first pixel signals Spx1_1, Spx1_2, and Spx1_3, etc., into the first digital signals D1_1, D1_2, and D1_3, etc., by comparing the ramp signal RAMP with each of the first pixel signals Spx1_1, Spx1_2, and Spx1_3, etc., but are not limited thereto.

The plurality of column lines, e.g., CL2_1 and CL2_2, etc., of the optical black region 220 may be connected to a plurality of second analog-to-digital converters, e.g., ADC2_1 and ADC2_2, etc., respectively. For example, the column line CL2_1 may be connected to the second analog-to-digital converter ADC2_1, and the column line CL2_2 may be connected to the second analog-to-digital converter ADC2_2, etc., but are not limited thereto.

The second analog-to-digital converters ADC2_1 and ADC2_2, etc., may convert the biased second pixel signals Spx2_1 and Spx2_2, etc., into second digital signals D2_1 and D2_2, etc. The second analog-to-digital converters ADC2_1 and ADC2_2, etc., may convert the biased second pixel signals Spx2_1 and Spx2_2, etc., output through the column line connected to the second analog-to-digital converters ADC2_1 and ADC2_2, etc., into the second digital signals D2_1 and D2_2, etc., but the example embodiments are not limited thereto. For example, the second analog-to-digital converter ADC2_2 of a selected row may convert the second pixel signal Spx2_2 into the second digital signal D2_2, etc., but the example embodiments are not limited thereto. The second analog-to-digital converters ADC2_1 and ADC2_2, etc., may convert the second pixel signals Spx2_1 and Spx2_2, etc., into the second digital signals D2_1 and D2_2, etc., by comparing the ramp signal RAMP with each of the second pixel signals Spx2_1 and Spx2_2, etc., but the example embodiments are not limited thereto.

A correction circuit (for example, the correction circuit 170 of FIG. 1, etc.) may correct the first digital signals D1_1, D1_2, and D1_3, etc., based on the second digital signals D2_1 and D2_2, etc. An average of the second digital signals D2_1 and D2_2, etc., output from the second analog-to-digital converters ADC2_1 and ADC2_2, etc., respectively connected to the plurality of column lines CL2_1 and CL2_2, etc., of the optical black region 220 may be subtracted from each of the first digital signals D1_1, D1_2, and D1_3, etc., output from first analog-to-digital converters ADC1_1, ADC1_2, and ADC1_3, etc., respectively connected to the plurality of column lines CL1_1, CL1_2, and CL1_3, etc., of the active region 210. For example, the correction circuit may correct the first digital signal D1_1 by subtracting an average of the second digital signal D2_1 and the second digital signal D2_1 from the first digital signal D1_1, and may correct the first digital signal D1_2 by subtracting an average of the second digital signal D2_1 and the second digital signal D2_1 from the first digital signal D1_2, but the example embodiments are not limited thereto.

Figure 3:
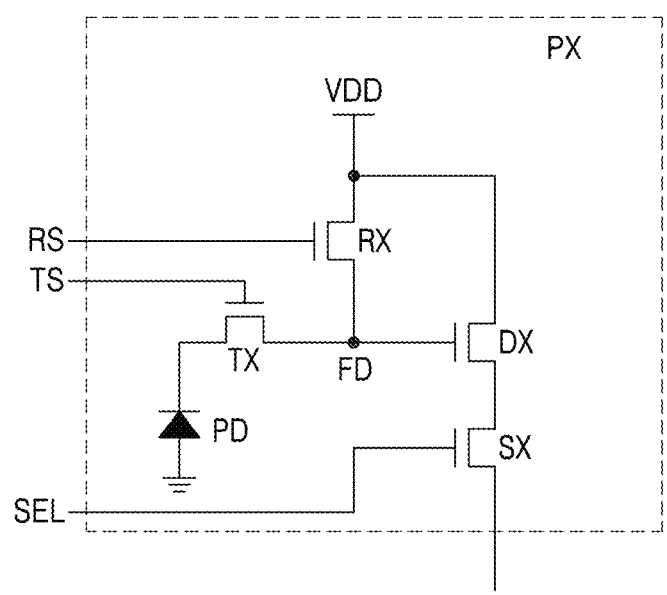
FIG. 3 is a diagram showing a pixel structure according to at least one example embodiment of the inventive concepts.

FIG. 3 is a diagram showing a pixel structure according to at least one example embodiment of the inventive concepts.

Referring to FIG. 3, a pixel PX may include a photodiode PD, but is not limited thereto. The pixel PX of FIG. 3 may be an active pixel, but the example embodiments are not limited thereto.

The photodiode PD may be replaced with another photosensitive device. The pixel PX may include a reset transistor RX, a transfer transistor TX, a driving transistor DX, and/or a selection transistor SX, etc. However, a structure of the pixel PX is not limited thereto and may be variously changed.

The photodiode PD may generate photocharges that vary according to and/or based on the intensity of incident light. The pixel PX may generate an analog pixel signal corresponding to the photodiode PD and/or internal reset noise, etc. That is, the active pixel may generate a first pixel signal that is an analog signal.

The pixel PX may operate based on a plurality of control signals, e.g., SEL, RS, and/or TS, etc., (also referred to as a selection control signal SEL, a reset control signal RS, and a transfer control signal TS, respectively) output from a row driver (for example, the row driver 120 of FIG. 1, etc.), but the example embodiments are not limited thereto. The transfer transistor TX may transmit the photocharges from the photodiode PD to a floating diffusion node FD according to and/or based on the transfer control signal TS. According to a potential of the photocharges accumulated in the floating diffusion node FD, the driving transistor DX may amplify the photocharges and output the amplified photocharges to the selection transistor SX. When the selection transistor SX is turned on in response to the selection control signal SEL, a sensing signal, that is, a photosensing signal, corresponding to a voltage level of the floating diffusion node FD may be output as an analog pixel signal (APS), for example, a pixel voltage, etc.

In some example embodiments, the reset transistor RX may reset the floating diffusion node FD based on a power supply voltage VDD according to and/or based on the reset control signal RS. In this case, a reset signal, for example, a noise signal, etc., corresponding to a voltage level of the floating diffusion node FD may be output as a first pixel signal.

An optical black pixel may be identical to and/or similar to the structure of the pixel PX of FIG. 3, but the example embodiments are not limited thereto. Because the optical black pixel is completely blocked from light, the optical black pixel may not include the photodiode PD, but is not limited thereto. The optical black pixel may generate a second pixel signal that is an analog signal corresponding to noise according to and/or based on intra-pixel charges, etc.

Figure 4:
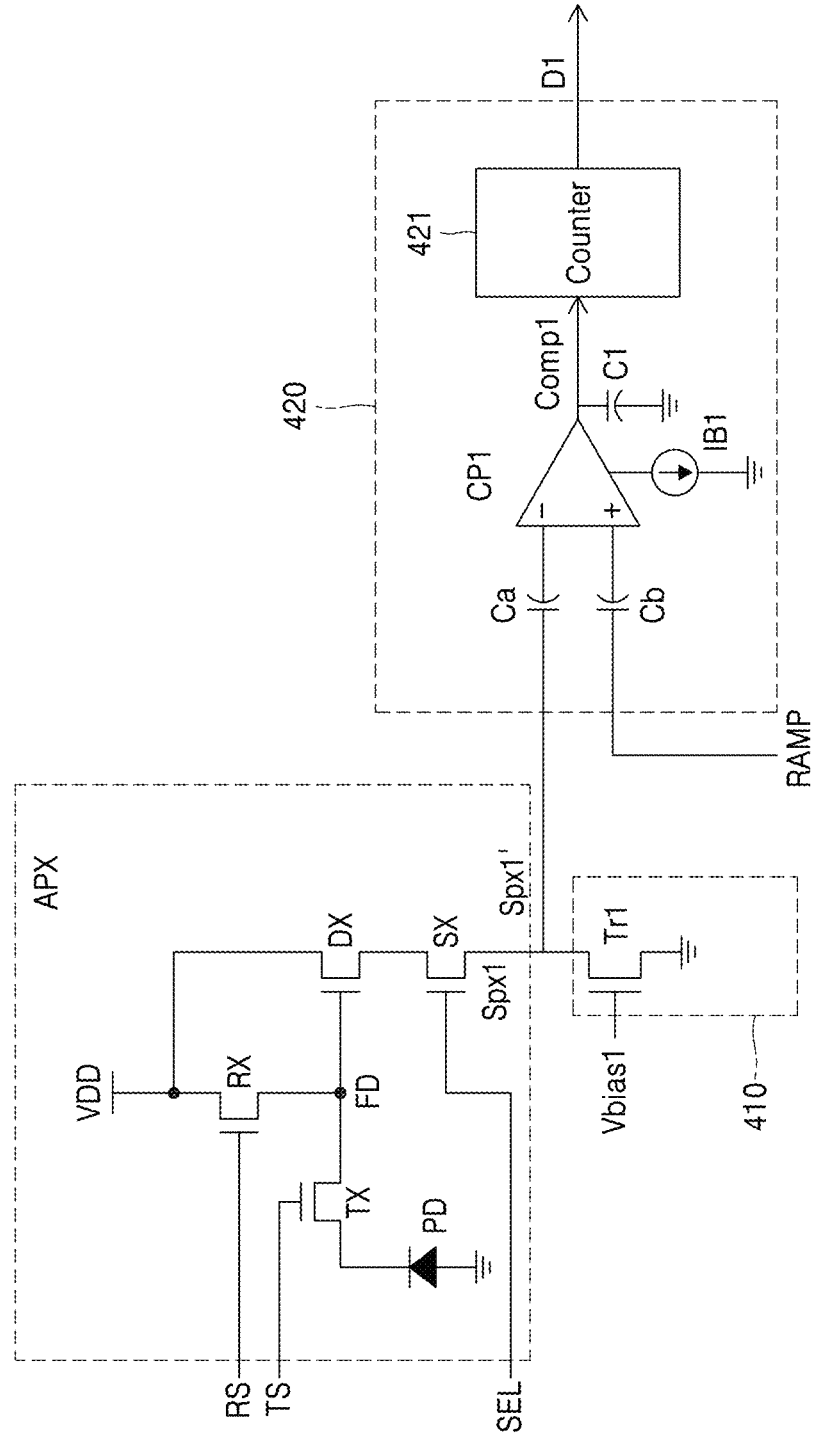
FIG. 4 is a diagram for explaining an operation of a first analog-to-digital converter, according to at least one example embodiment of the inventive concepts.

FIG. 4 is a diagram for explaining an operation of a first analog-to-digital converter, according to at least one example embodiment of the inventive concepts. FIG. 5 is a diagram for explaining an operation of a second analog-to-digital converter, according to at least one example embodiment of the inventive concepts.

Referring to FIG. 4, an active pixel APX may be connected to a first biasing circuit 410 and/or a first analog-to-digital converter 420, etc., but is not limited thereto. Although omitted in FIG. 4, the first biasing circuit 410 and the first analog-to-digital converter 420 may be connected to a column line of an active region, but the example embodiments are not limited thereto.

The first biasing circuit 410 may bias a first pixel signal Spx1 based on a first bias voltage Vbias1, but is not limited thereto. The first biasing circuit 410 may bias the first pixel signal Spx1 to a first pixel signal Spx1'. The first biasing circuit 410 may form a source follower and a driving transistor DX of the active pixel APX, but is not limited thereto. The first pixel signal Spx1' may be input to the first analog-to-digital converter 420.

The first biasing circuit 410 may include at least one switching device, but is not limited thereto. For example, the first biasing circuit 410 may include a switching device Tr1, etc. A switching device may include a bipolar junction transistor (BJT), metal-oxide-semiconductor field effect transistor (MOSFET), or the like, but is not limited to the listed types of the switching device.

The first analog-to-digital converter 420 may include a first comparator CP1, a first output capacitor C1, a plurality of capacitors Ca and Cb, and/or a counter 421, etc., but is not limited thereto.

The first comparator CP1 may compare a ramp signal RAMP output from a ramp signal generator (for example, the ramp signal generator 140 of FIG. 1, etc.) with the first pixel signal Spx1', and may output a result of the comparing as a logic low signal or a logic high signal. The first comparator CP1 may generate, as a first comparison signal COMP1, a result of the comparing to which a CDS technique is applied, but is not limited thereto. The capacitor Ca may make only a current signal of the first pixel signal Spx1' pass, and the capacitor Cb may make only a current signal of the ramp signal RAMP pass, etc.

The first comparator CP1 may be driven based on a bias current IB1. The first output capacitor C1 may be connected to an output terminal of the first comparator CP1, and random noise of the first analog-to-digital converter 420 (e.g., random noise generated by the first analog-to-digital converter 420) may be adjusted (and/or compensated for) based on a capacitance of the first output capacitor C1.

The counter 421 may receive the first comparison signal COMP1 from the first comparator CP1, but is not limited thereto. The counter 421 may receive a clock signal from a timing controller (for example, the timing controller 130 of FIG. 1, etc.). The counter 421 may count the first comparison signal COMP1 output from the first comparator CP1 based on the clock signal in a period in which a counting signal is activated, for example, in a period in which the clock signal is logic high, but the example embodiments are not limited thereto. For example, the counter 421 may count the number of times that the first comparison signal COMP1 is logic high in synchronization with the clock signal, but is not limited thereto. The counter 421 may output a first digital signal D1 according to and/or based on a result of the counting.

Figure 5:
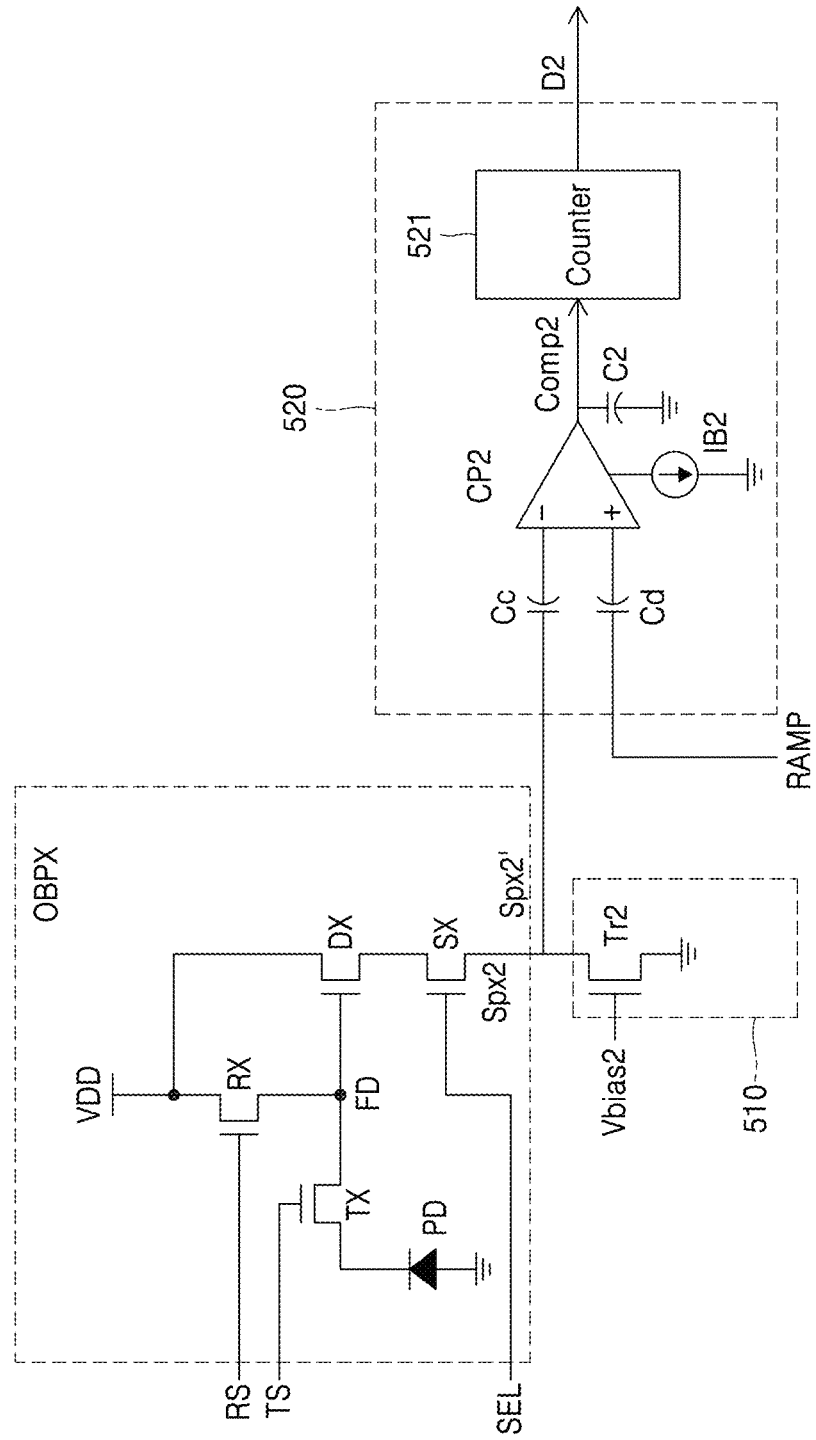
FIG. 5 is a diagram for explaining an operation of a second analog-to-digital converter, according to at least one example embodiment of the inventive concepts.

Referring to FIG. 5, an optical black pixel OBPX may be connected to a second biasing circuit 510 and a second analog-to-digital converter 520, but is not limited thereto. Although not shown in FIG. 5, the second biasing circuit 510 and the second analog-to-digital converter 520 may be connected to a column line of an optical black region, etc.

The second biasing circuit 510 may bias a second pixel signal Spx2 based on a second bias voltage Vbias2. The second biasing circuit 510 may bias the second pixel signal Spx2 to a second pixel signal Spx2'. The second biasing circuit 510 may form a source follower and a driving transistor DX of the optical black pixel OBPX, but the example embodiments are not limited thereto. The second pixel signal Spx2' may be input to the second analog-to-digital converter 520, etc. The second biasing circuit 510 may include at least one switching device, but is not limited thereto. The second biasing circuit 510 may include a switching device Tr2, etc., but is not limited thereto.

The second analog-to-digital converter 520 may include a second comparator CP2, a second output capacitor C2, capacitors Cc and Cd, and/or a counter 521, etc., but is not limited thereto.

The second comparator CP2 may compare a ramp signal RAMP output from a ramp signal generator with the second pixel signal Spx2', and may output a result of the comparing as a logic low signal or a logic high signal. The second comparator CP2 may generate, as a second comparison signal COMP2, a result of the comparing to which a CDS technique is applied, but is not limited thereto. The capacitor Cc may make only a current signal of the second pixel signal Spx2' pass, and the capacitor Cd may make only a current signal of the ramp signal RAMP pass, but the example embodiments are not limited thereto.

The second comparator CP2 may be driven based on a bias current IB2. The second output capacitor C2 may be connected to an output terminal of the second comparator CP2, and random noise of the second analog-to-digital converter 520 (e.g., random noise generated by the second analog-to-digital converter 520, etc.) may be adjusted (and/or compensated for) based on a capacitance of the second output capacitor C2, etc.

The counter 521 may receive a clock signal from a timing controller, but is not limited thereto. The counter 521 may count the second comparison signal COMP2 output from the second comparator CP2 based on the clock signal in a period in which a counting signal is activated, for example, in a period in which the clock signal is logic high, but the example embodiments are not limited thereto. The counter 521 may output a second digital signal D2 according to a result of the counting, etc.

Referring to FIGS. 4 and 5, as the number of second analog-to-digital converters 520 connected to the optical black pixel OBPX increases, horizontal noise of image data output from an image sensor may be accurately removed, but when the number of second analog-to-digital converters 520 increases, a total size (e.g., a total physical size and/or physical area) of the image sensor may increase. When the second analog-to-digital converter 520 of at least one example embodiment which generates low and/or reduced noise is implemented, the same effect as that of increasing the number of conventional second analog-to-digital converters may be obtained. The random noise of the second analog-to-digital converter 520 may be smaller than the random noise of the first analog-to-digital converter 420, and the second analog-to-digital converter 520 may be implemented with low and/or reduced noise.

In at least one example embodiment, a transconductance of the second biasing circuit 510 may be less than a transconductance of the first biasing circuit 410, but the example embodiments are not limited thereto. For example, a transconductance of the switching device Tr2 included in the second biasing circuit 510 may be less than a transconductance of the switching device Tr1 included in the first biasing circuit 410, etc. The first pixel signal Spx1' may include noise of the first biasing circuit 410 (e.g., noise generated by the first biasing circuit 410), and the second pixel signal Spx2' may include noise of the second biasing circuit 510 (e.g., noise generated by the second biasing circuit 510). Because the transconductance of the second biasing circuit 510 is less than that of the first biasing circuit 410, the second pixel signal Spx2' may include the noise of the second biasing circuit 510, which is smaller than the noise of the first biasing circuit 410, etc. Because random noise of the second pixel signal Spx2' is smaller than random noise of the first analog-to-digital converter 420, the second analog-to-digital converter 520 may be implemented with low noise and/or reduced noise.

In at least one example embodiment, a capacitance of the second output capacitor C2 may be greater than a capacitance of the first output capacitor C1, but is not limited thereto. When the capacitance of the second output capacitor C2 is greater than the capacitance of the first output capacitor C1, the random noise of the second analog-to-digital converter 520 may be smaller than the random noise of the first analog-to-digital converter 420, and the second analog-to-digital converter 520 may be implemented with low noise and/or reduced noise.

In at least one example embodiment, the bias current IB2 driving the second comparator CP2 may be greater than the bias current IB1 driving the first comparator CP1, but is not limited thereto. When a bias current is large, a relative proportion of random noise of an analog-to-digital converter may decrease, and thus the random noise of the second analog-to-digital converter 520 may be smaller than the random noise of the first analog-to-digital converter 420, etc.

A size of the second comparator CP2 may be greater than a size of the first comparator CP1, but is not limited thereto. A size of a comparator may refer to a size (e.g., a physical size and/or physical area) of a comparator device. As the size of the comparator increases, a bias current driving the comparator may become larger. Thus, when the size of the second comparator CP2 is greater than the size of the first comparator CP1, the second analog-to-digital converter 520 may be implemented with low noise and/or reduced noise.

In at least one example embodiment, a bandwidth of the random noise of the first analog-to-digital converter 420 may be equal to a bandwidth of the random noise of the second analog-to-digital converter 520, but the example embodiments are not limited thereto. When the second comparator CP2 is driven with the bias current IB2 greater than the bias current IB1 and the capacitance of the second output capacitor C2 connected to the output terminal of the second comparator CP2 is greater than the capacitance of the first output capacitor C1, the random noise of (and/or generated by) the second analog-to-digital converter 520 may be smaller than the random noise of (and/or generated by) the first analog-to-digital converter 420, and the bandwidth of the random noise of the first analog-to-digital converter 420 may be equal to the bandwidth of the random noise of the second analog-to-digital converter 520, but the example embodiments are not limited thereto. Because the bandwidth of the random noise of the first analog-to-digital converter 420 is equal to the bandwidth of the random noise of the second analog-to-digital converter 520, the image sensor may be easily driven and/or more easily driven (e.g., drive using less current, etc.).

Figure 6:
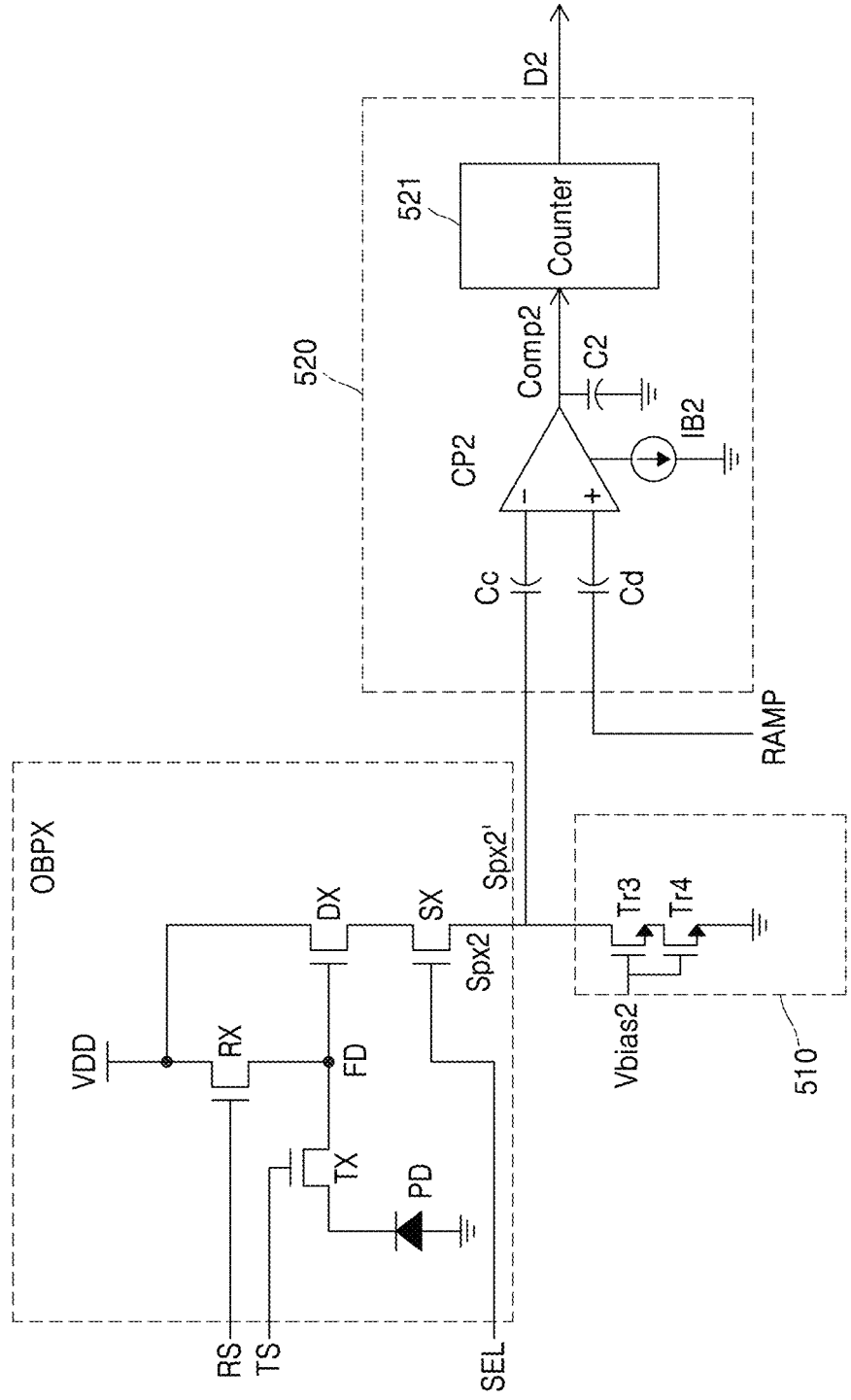
FIG. 6 is a diagram for showing a second biasing circuit according to at least one example embodiment of the inventive concepts.

FIG. 6 is a diagram for showing a second biasing circuit according to at least one example embodiment of the inventive concepts.

Referring to FIG. 6, the second biasing circuit 510 may include a switching device Tr3 and/or a switching device Tr4, etc., but the example embodiments are not limited thereto. According to at least one example embodiment, FIG. 6 may be a continuation of FIG. 5, and duplicate description is omitted, but the example embodiments are not limited thereto.

Referring to FIGS. 4 and 6, each of the first biasing circuit 410 and the second biasing circuit 510 may include at least one switching device, and a width and length of a switching device included in the first biasing circuit 410 may be equal to those of a switching device included in the second biasing circuit 510, but the example embodiments are not limited thereto. The width of the switching device may refer to a channel width of the switching device, and the length of the switching device may refer to a channel length of the switching device. For example, the switching device Tr1 included in the first biasing circuit 410 and the switching devices Tr3 and Tr4 included in the second biasing circuit 510 may have the same channel width and the same channel length, but are not limited thereto.

The number of switching devices included in the first biasing circuit 410 may be different from the number of switching devices included in the second biasing circuit 510, and a width and length of a switching device included in the first biasing circuit 410 may be equal to those of a switching device included in the second biasing circuit 510, but are not limited thereto. In at least one example embodiment, the number of switching devices included in the second biasing circuit 510 may be greater than the number of switching devices included in the first biasing circuit 410, but the example embodiments are not limited thereto. For example, although the number of switching devices included in the first biasing circuit 410 may be one and the number of switching devices included in the second biasing circuit 510 may be two, but the example embodiments of the inventive concepts are not limited thereto.

Switching devices having the same channel width and length are included more in the second biasing circuit 510 than in the first biasing circuit 410 (e.g., the second biasing circuit 510 may have a larger number of switching devices having the same channel width and length than the first biasing circuit 410), and thus, the transconductance of the second biasing circuit 510 may be less than the transconductance of the first biasing circuit 410, and the second analog-to-digital converter 520 may therefore be implemented with low noise and/or reduced noise, etc. For example, the transconductance of the first biasing circuit 410 may be twice the transconductance of the second biasing circuit 510, etc., but the example embodiments are not limited thereto.

Figure 7:
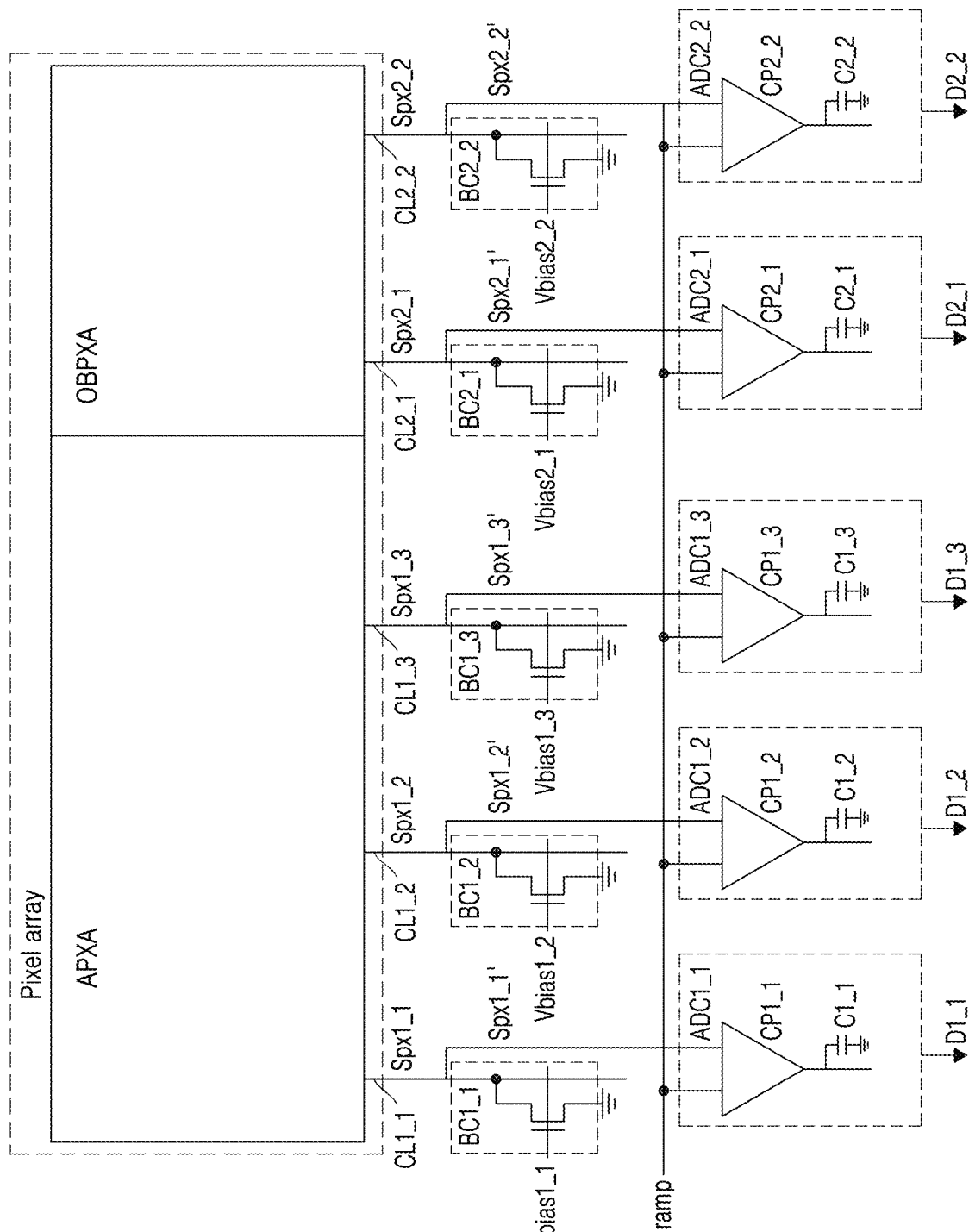
FIG. 7 is a diagram for describing an image sensor according to at least one example embodiment of the inventive concepts.

FIG. 7 is a diagram for describing an image sensor according to at least one example embodiment of the inventive concepts.

Referring to FIG. 7, a pixel array may include at least one active region APXA and at least one optical black region OBPXA, etc., but is not limited thereto. Each of column lines of the pixel array may output a pixel signal. For example, column lines CL1_1, CL1_2, and CL1_3, etc., of the active region APXA may output first pixel signals Spx1_1, Spx1_2, and Spx1_3, etc., respectively, and column lines CL2_1 and CL2_2, etc., of the optical black region OBPXA may output second pixel signals Spx2_1 and Spx2_2, etc., respectively, but the example embodiments are not limited thereto, and for example, there may be a different number of column lines and/or pixel signals in the active region APXA and/or the optical black region OBPXA, etc. In other words, although FIG. 7 shows that the number of column lines of the active region APXA is three and the number of column lines of the optical black region OBPXA is two, the number of column lines included in each of the active region APXA and the optical black region OBPXA is not necessarily limited thereto.

A first biasing circuit BC1_1 may be connected to a column line CL1_1, the first biasing circuit BC1_1 may bias a first pixel signal Spx1_1 based on a first bias voltage Vbias1_1, and a biased first pixel signal Spx1_1' is provided to a first analog-to-digital converter ADC1_1, etc. A first biasing circuit BC1_2 may bias a first pixel signal Spx1_2 based on a first bias voltage Vbias1_2, a first biasing circuit BC1_3 may bias a first pixel signal Spx1_3 based on a first bias voltage Vbias1_3, and a biased first pixel signal Spx1_2' and a biased first pixel signal Spx1_3' may be provided to a first analog-to-digital converter ADC1_2 and a first analog-to-digital converter ADC1_3, respectively, but the example embodiments are not limited thereto. The first bias voltage Vbias1_1, the first bias voltage Vbias1_2, and/or the first bias voltage Vbias1_3, etc., may be of the same value or different values.

The first analog-to-digital converter ADC1_1 may include a first comparator CP1_1 and/or a first output capacitor C1_1, etc., but is not limited thereto. The first analog-to-digital converter ADC1_1 may output a first digital signal D1_1 by comparing a ramp signal RAMP with the first pixel signal Spx1_1', etc. The first analog-to-digital converter ADC1_2 and the first analog-to-digital converter ADC1_3 may output a first digital signal D1_2 and a first digital signal D1_3, respectively, etc.

A second biasing circuit BC2_1 may bias a second pixel signal Spx2_1 based on a second bias voltage Vbias2_1, a second biasing circuit BC2_2 may bias a second pixel signal Spx2_2 based on a second bias voltage Vbias2_2, and/or a biased second pixel signal Spx2_1' and a biased second pixel signal Spx2_2' may be provided to a second analog-to-digital converter ADC2_1 and a second analog-to-digital converter ADC2_2, respectively, but the example embodiments are not limited thereto. The second bias voltage Vbias2_1 and the second bias voltage Vbias2_2 may be of the same value or different values.

The second analog-to-digital converter ADC2_1 may include a second comparator CP2_1 and a second output capacitor C2_1, etc., but is not limited thereto. The second analog-to-digital converter ADC2_1 may output a second digital signal D2_1 by comparing a ramp signal RAMP with the second pixel signal Spx2_1'. The second analog-to-digital converter ADC2_2 may output a second digital signal D2_2.

A transconductance of each of the second biasing circuit BC2_1 and the second biasing circuit BC2_2 may be less than a transconductance of each of the first biasing circuit BC1_1, the first biasing circuit BC1_2, and/or the first biasing circuit BC1_3, but the example embodiments are not limited thereto.

A capacitance of each of the second output capacitor C2_1 and a second output capacitor C2_2 may be greater than a capacitance of each of the first output capacitor C1_1, a first output capacitor C1_2, and/or a first output capacitor C1_3, etc., but are not limited thereto.

A bias current driving each of the second comparator CP2_1 and a second comparator CP2_2 may be greater than a bias current driving each of the first comparator CP1_1, a first comparator CP1_2, and/or a first comparator CP1_3, etc., but are not limited thereto.

Figure 8:
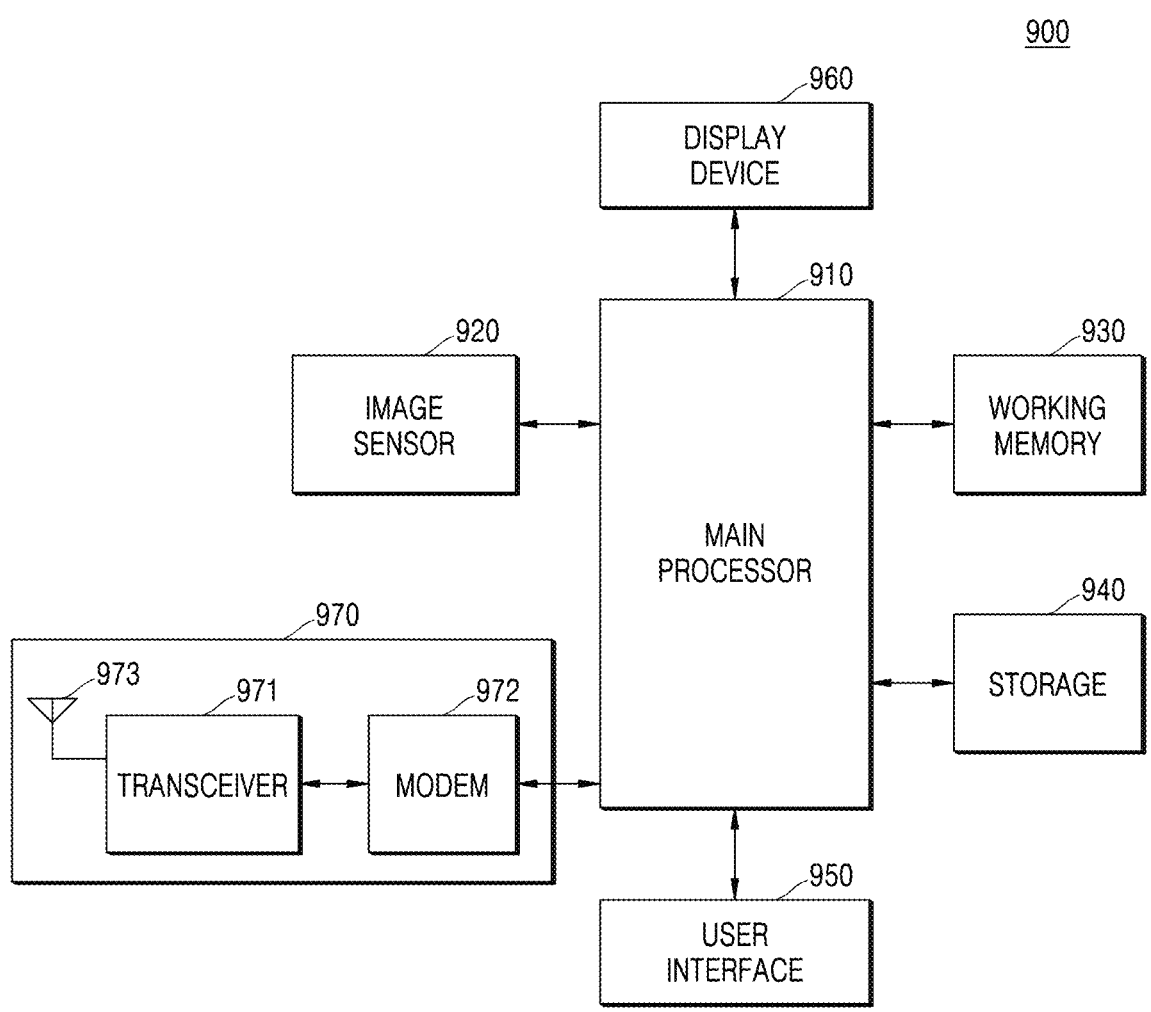
FIG. 8 is a block diagram showing an electronic device including an image sensor, according to at least one example embodiment of the inventive concepts.

FIG. 8 is a block diagram showing an electronic device including an image sensor, according to at least one example embodiment of the inventive concepts. An electronic device 900 of FIG. 8 may include a portable terminal, but the example embodiments are not limited thereto, and for example, the electronic device 900 may be a stationary device, etc.

Referring to FIG. 8, the electronic device 900 may include at least one image sensor 920, at least one main processor 910, at least one display device 960, at least one working memory 930, at least one storage 940 (e.g., storage device, etc.), a user interface 950, and/or a wireless transceiver 970, etc., but the example embodiments are not limited thereto, and for example, the electronic device 900 may include a greater or lesser number of constituent components, etc. According to some example embodiments, one or more components of the electronic device 900, such as the image sensor 920, main processor 910, working memory 930, storage device 940, and/or wireless transceiver 970, etc., may be implemented as processing circuitry. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The image sensor 920 of FIG. 8 may correspond to the image sensor 100 of FIG. 1, but is not limited thereto. A description of parts that are the same as those of FIG. 1 will be omitted.

The main processor 910 may control all operations of the electronic device 900 and may be provided as a system-on-chip (SoC) that drives an application program, an operating system, and the like, but the example embodiments are not limited thereto. The main processor 910 may receive image data from the image sensor 920 and perform image processing on the received image data, etc. In some example embodiments, the main processor 910 may store the received image data and/or the processed image data in the memory 930 and/or the storage 940, but is not limited thereto.

The memory 930 may store programs and/or data processed and/or executed by the main processor 910, but is not limited thereto. The storage 940 may be implemented with a non-volatile memory device like a NAND flash and/or a resistive memory, etc., but is not limited thereto. For example, the storage 940 may be provided as a memory card (an MMC, an eMMC, an SD card, a micro SD card, etc.), etc. The storage 940 may store data and/or a program for an execution algorithm for controlling an image processing operation of the main processor 910, and the data and/or program is loaded into the memory 930 when the image processing operation is performed, etc.

The user interface 950 may be implemented with various devices capable of receiving user input, such as a keyboard, a curtain key panel, a touch panel, a fingerprint sensor, a camera, and/or a microphone, etc. The user interface 950 may receive a user input and may provide the main processor 910 with a signal corresponding to and/or based on the received user input. The wireless transceiver 970 may include a transceiver 971, a modem 972, and/or an antenna 973, etc., but is not limited thereto.

Figure 9:
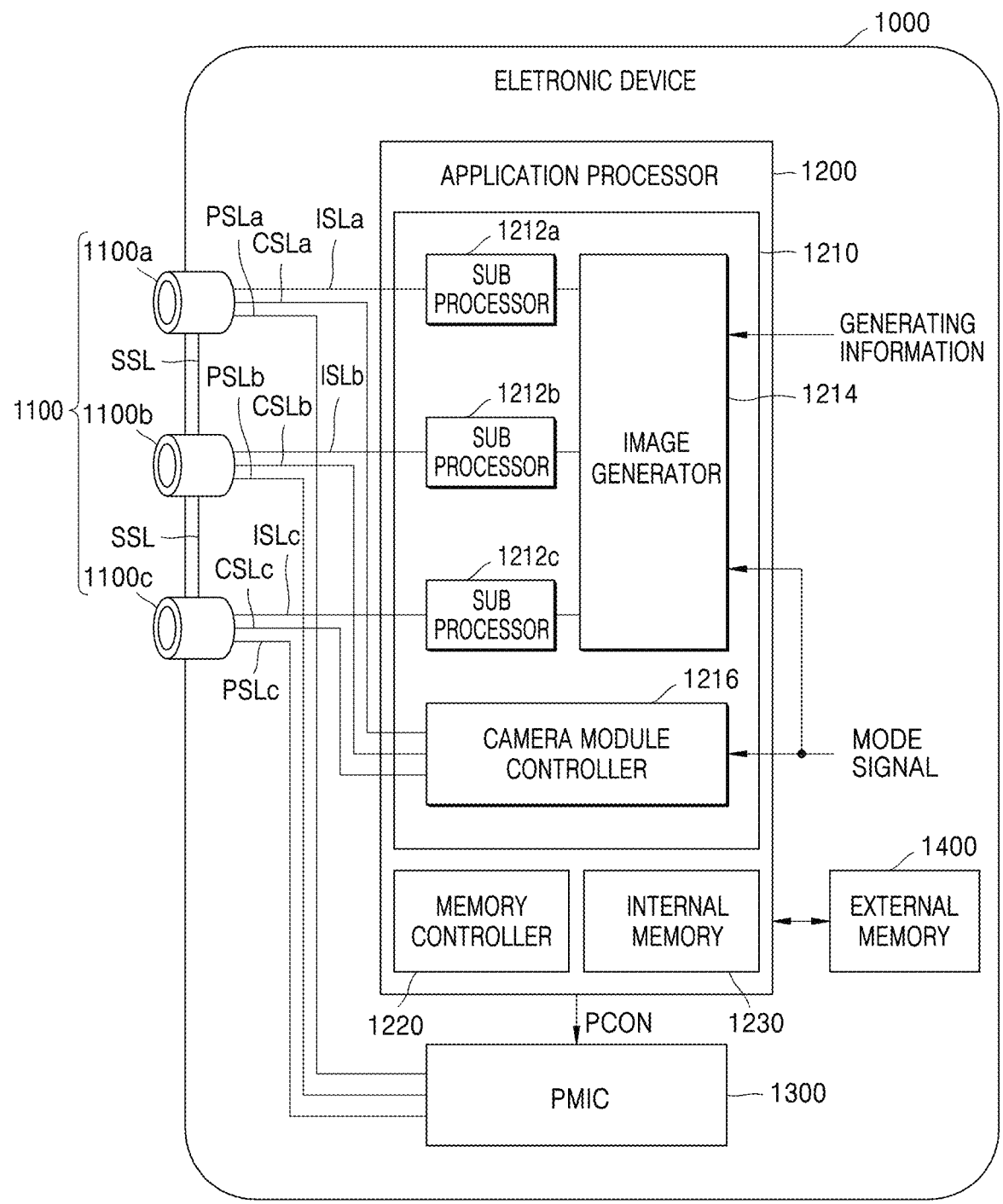
FIG. 9 is a block diagram of an electronic device including a multi-camera module according to at least one example embodiment.
Figure 10:
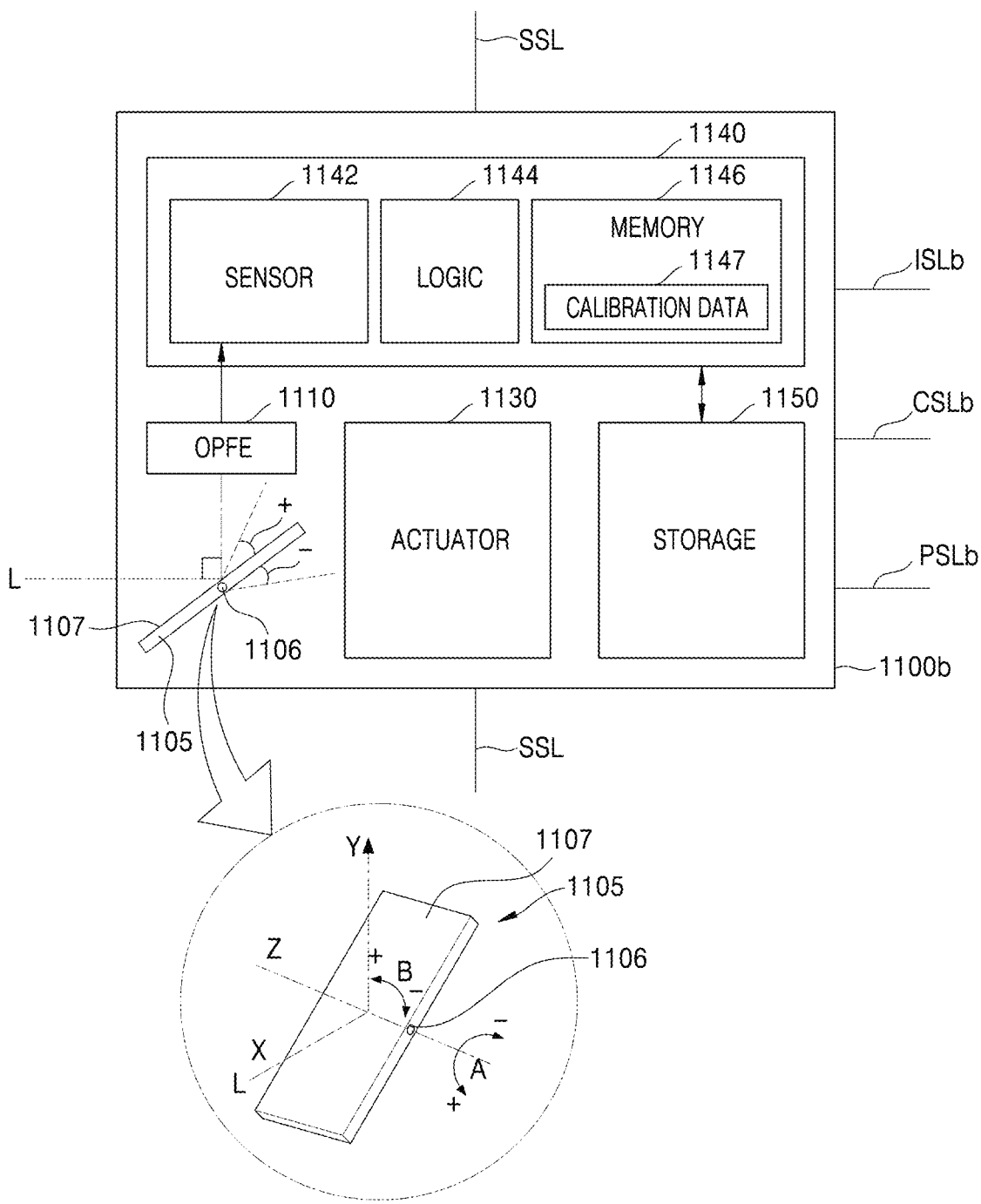
FIG. 10 is a detailed block diagram of the multi-camera module of FIG. 9 according to at least one example embodiment.

FIG. 9 is a block diagram of an electronic device including a multi-camera module according to at least one example embodiment. FIG. 10 is a detailed block diagram of the multi-camera module of FIG. 9 according to at least one example embodiment.

Referring to FIG. 9, an electronic device 1000 may include a camera module group 1100, an application processor 1200, a power management integrated circuit (PMIC) 1300, and/or an external memory 1400, etc., but is not limited thereto, and for example, may include a greater or lesser number of constituent components, etc. According to some example embodiments, one or more components of the electronic device 1000, such as the camera module group 1100, application processor 1200, power management integrated circuit (PMIC) 1300, and/or external memory 1400, etc., may be implemented as processing circuitry. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The camera module group 1100 may include a plurality of camera modules 1100a, 1100b, and 1100c. Although at least one example embodiment in which the three camera modules 1100a, 1100b, and 1100c are arranged is illustrated in the drawing, the example embodiments are not limited thereto. In some example embodiments, the camera module group 1100 may be modified to include only two camera modules. In some example embodiments, the camera module group 1100 may be modified to include "n" (where "n" is a natural number of at least 4) camera modules, but the example embodiments are not limited thereto.

The detailed configuration of the camera module 1100b will be described with reference to FIG. 10 below. The descriptions below may also be applied to the other camera modules 1100a and 1100c.

Referring to FIG. 10, the camera module 1100b may include a prism 1105, an optical path folding element (OPFE) 1110, an actuator 1130, an image sensing device 1140, and/or a storage 1150, etc., but is not limited thereto.

The prism 1105 may include a reflective surface 1107 of a light reflecting material to modify a path of light L incident from the outside.

In some example embodiments, the prism 1105 may change the path of the light L incident in a first direction X to a second direction Y perpendicular to the first direction X. In addition, the prism 1105 may rotate the reflective surface 1107 of the light reflecting material in the direction A with respect to a central axis 1106 and/or rotate the central axis 1106 in the direction B to change the path of the light L incident in the first direction X to the second direction Y perpendicular to the first direction X, etc. In this case, the OPFE 1110 may also move in a third direction Z perpendicular to the first direction X and the second direction Y, etc.

In some example embodiments, an A-direction maximum rotation angle of the prism 1105 may be less than and/or equal to 15 degrees in a plus (+) A direction and greater than 15 degrees in a minus (−) A direction, but the example embodiments are not limited thereto.

In some example embodiments, the prism 1105 may move between 20 degrees in the plus (+) or minus (−) B direction, and/or between 10 degrees and 20 degrees, and/or between 15 degrees and 20 degrees, where the angle of movement may be the same as the angle of movement in the plus (+) or minus (−) B direction and/or may be almost similar to the angle of movement in the range between 1 degree, but the example embodiments are not limited thereto.

In some example embodiments, the prism 1105 may move the center axis 1106 of the light reflecting material to a third direction (for example, Z direction) in parallel with an extended direction of the center axis 1106, but is not limited thereto.

The OPFE 1110 may include, for example, an optical lens including m (where m is a natural number) groups. The m lenses may move, for example, in the second direction Y to change an optical zoom ratio of the camera module 1100b, etc. For example, in a case where the basic optical zoom ratio of the camera module 1100b is A, when the m optical lenses included in the OPFE 1110 move, the optical zoom ratio of the camera module 1100b may change to 3 A, 5 A and/or an optical zoom ratio greater than 5 A, etc., but the example embodiments are not limited thereto.

The actuator 1130 may move the OPFE 1110 and/or the optical lens to a specific position. For example, the actuator 1130 may adjust the position of the optical lens such that an image sensor 1142 is positioned at a focal length of the optical lens for accurate sensing, etc.

The image sensing device 1140 may include the image sensor 1142, a control logic 1144, and/or a memory 1146, etc. The image sensor 1142 may sense an image of a sensing target using the light L provided through the optical lens. The image sensor 1142 may include an image sensor according to at least one example embodiment of the inventive concepts. The control logic 1144 may control some and/or all operations of the camera module 1100b, but the example embodiments are not limited thereto. For example, the control logic 1144 may control an operation of the camera module 1100b according to and/or based on a control signal provided via a control signal line CSLb, etc. YYY The memory 1146 may store information desired and/or necessary for the operation of the camera module 1100b, such as calibration data 1147, etc., but is not limited thereto. The calibration data 1147 may include information, which is desired and/or necessary for the camera module 1100b to generate image data using the light L provided from the outside and/or an external source, etc. For example, the calibration data 1147 may include information about the degree of rotation, information about a focal length, information about an optical axis, and/or the like. When the camera module 1100b is implemented in the form of a multi-state camera having a focal length changing according to and/or based on the position of the optical lens, the calibration data 1147 may include information related to a focal length value for each position (or each state) of the optical lens and auto focusing, etc.

The storage 1150 may store image data sensed through the image sensor 1142. The storage 1150 may be outside the image sensing device 1140 and may be implemented to be stacked with a sensor chip constituting the image sensing device 1140, but the example embodiments are not limited thereto. In some example embodiments, the storage 1150 may be implemented as an electrically erasable programmable read-only memory (EEPROM), but the example embodiments are not limited thereto, and other memory types may be used.

Referring to FIGS. 9 and 10, in some example embodiments, the plurality of camera modules, e.g., 1100a, 1100b, and 1100c, etc., may each include the actuator 1130, but the example embodiments are not limited thereto. Accordingly, each of the plurality of camera modules 1100a, 1100b, and 1100c, etc., may include the same or different calibration data 1147 according to the operation of the actuator 1130 included therein, etc.

In some example embodiments, at least one (e.g., the camera module 1100b, etc.) of the camera modules 1100a, 1100b, and 1100c may be of a folded-lens type including the prism 1105 and the OPFE 1110, while the other camera modules (e.g., the camera modules 1100a and 1100c, etc.) may be of a vertical type that does not include the prism 1105 and the OPFE 1110. However, the example embodiments are not limited thereto.

In some example embodiments, at least one camera module (e.g., 1100c, etc.) among the plurality of camera modules 1100a, 1100b, and 1100c, etc., may be a vertical-type depth camera extracting depth information using, for example, an infrared ray (IR) depth camera, a Time of Flight camera, etc. In this case, the application processor 1200 may merge image data provided from the depth camera with image data provided from another camera module (e.g., 1100a and/or 1100b, etc.) to generate a 3D depth image.

In some example embodiments, at least two camera modules (e.g., 1100a and 1100b, etc.) among the plurality of camera modules 1100a, 1100b, and 1100c, etc., may have different observation fields of view. In this case, for example, the optical lenses of at least two camera modules (e.g., 1100a and 1100b, etc.) among the plurality of camera modules 1100a, 1100b, and 1100c, etc., may be different from each other, but the example embodiments are not limited thereto.

Also, in some example embodiments, the plurality of camera modules 1100a, 1100b, and 1100c, etc., may have different fields of view. In this case, the optical lenses included in the plurality of camera modules 1100a, 1100b, and 1100c, etc., may also be different from each other, but the example embodiments are not limited thereto.

In some example embodiments, the plurality of camera modules 1100a, 1100b, and 1100c, etc., may be physically separated from each other. That is, a sensing area of one image sensor, e.g., image sensor 1142, etc., may not be divided and used by the plurality of camera modules 1100a, 1100b, and/or 1100c, etc., but an independent image sensor 1142 may be in each of the plurality of camera modules 1100a, 1100b, and/or 1100c, etc., but the example embodiments are not limited thereto.

Referring back to FIG. 9, the application processor 1200 may include an image processing unit 1210 (e.g., an image processing device 1210, etc.), a memory controller 1220, and/or an internal memory 1230, etc., but is not limited thereto. The application processor 1200 may be implemented separately from the plurality of camera modules 1100a, 1100b, and/or 1100c, etc., but is not limited thereto. For example, the application processor 1200 and the plurality of camera modules 1100a, 1100b, and 1100c may be implemented as separate semiconductor chips, etc.

The image processing device 1210 may include a plurality of sub-image processors 1212a, 1212b, and/or 1212c, etc., at least one image generator 1214, and/or a camera module controller 1216, etc.

The number of sub-image processors 1212a, 1212b, and 1212c included in the image processing device 1210 may correspond to the number of camera modules 1100a, 1100b, and 1100c, but the example embodiments are not limited thereto.

Pieces of image data respectively generated by the camera modules 1100a, 1100b, and/or 1100c, etc., may be provided to the sub-image processors 1212a, 1212b, and/or 1212c, etc., respectively, through a plurality of image signal lines ISLa, ISLb, and/or ISLc, etc., separated from one another, respectively. For example, the image data generated by the camera module 1100a may be provided to the sub-image processor 1212a via the image signal line ISLa, the image data generated by the camera module 1100b may be provided to the sub-image processor 1212b via the image signal line ISLb, and the image data generated by the camera module 1100c may be provided to the sub-image processor 1212c via the image signal line ISLc, but the example embodiments are not limited thereto. Such image data transmission may be performed using, for example, a mobile industry processor interface (MIPI) based camera serial interface (CSI), but the example embodiments are not limited thereto.

In some example embodiments, a single sub-image processor may be arranged to correspond to a plurality of camera modules. For example, the sub-image processor 1212a and the sub-image processor 1212c are not implemented separately from each other as shown, but may be integrated and implemented as a sub-image processor and the image data provided from the camera module 1100a and the camera module 1100c may be selected through a selection element (e.g., a multiplexer), etc., and then provided to the integrated sub-image processor, but the example embodiments are not limited thereto.

The pieces of image data respectively provided to the sub-image processors 1212a, 1212b, and/or 1212c, etc., may be provided to the image generator 1214. The image generator 1214 may generate an output image by using the pieces of image data respectively provided from the sub-image processors 1212a, 1212b, and/or 1212c, etc., according to image generating information and/or a mode signal.

For example, the image generator 1214 may generate an output image by merging at least some of the pieces of image data respectively generated by the camera modules 1100a, 1100b, and/or 1100c, etc., having different fields of view, according to and/or based on the image generating information and/or the mode signal, etc. The image generator 1214 may generate an output image by selecting at least one from the pieces of image data respectively generated by the camera modules 1100a, 1100b, and/or 1100c, etc., having different fields of view, according to the image generating information and/or the mode signal.

In some example embodiments, the image generating information may include a zoom signal and/or a zoom factor. Also, in some example embodiments, the mode signal may be, for example, a signal based on a mode selected by a user.

When the image generating information is the zoom signal (e.g., the zoom factor) and the camera modules 1100a, 1100b, and/or 1100c, etc., have different observation fields of view, the image generator 1214 may perform different operations according to and/or based on the type of the zoom signal. For example, when the zoom signal is a first signal, the image generator 1214 may merge image data output from the camera module 1100a and image data output from the camera module 1100c and then generate an output image by using a merged image signal and image data output from the camera module 1100b and not used for merging, but the example embodiments are not limited thereto. When the zoom signal is a second signal different from the first signal, the image generator 1214 may generate an output image by selecting one of the pieces of image data respectively output from the camera modules 1100a, 1100b, and/or 1100c, etc., instead of performing the merging. However, the example embodiments are not limited thereto, and a method of processing image data may be modified and implemented as needed.

In some example embodiments, the image generator 1214 may receive a plurality of pieces of image data, which have different exposure times, from at least one of the sub-image processors 1212a, 1212b, and/or 1212c, etc., and perform high dynamic range (HDR) processing on the pieces of image data, thereby generating merged image data having an increased dynamic range, but the example embodiments are not limited thereto.

The camera module controller 1216 may provide a control signal to each of the camera modules 1100a, 1100b, and/or 1100c, etc. The control signal generated from the camera module controller 1216 may be provided to the corresponding camera modules 1100a, 1100b, and/or 1100c, etc., through a plurality of control signal lines CSLa, CSLb, and/or CSLc, etc., separated from one another.

Any one of the plurality of camera modules 1100a, 1100b, 1100c, etc., may be designated as a master camera (e.g., 1100b) according to and/or based on the image generating information including the zoom signal and/or the mode signal, and the remaining camera modules (e.g., 1100a and 1100c) may be designated as slave cameras, but the example embodiments are not limited thereto. Such information may be included in the control signal and provided to the corresponding camera modules 1100a, 1100b, and 1100c through the control signal lines CSLa, CSLb, and CSLc separated from each other, but the example embodiments are not limited thereto.

Camera modules operating as a master and a slave may change according to a zoom factor and/or an operation mode signal. For example, when the field-of-view of the camera module 1100a is greater than that of the camera module 1100b and the zoom factor indicates a low zoom ratio, the camera module 1100a may operate as a master and the camera module 1100b may operate as a slave, but the example embodiments are not limited thereto. Contrarily, when the zoom factor indicates a high zoom ratio, the camera module 1100b may operate as a master and the camera module 1100a may operate as a slave, etc.

In some example embodiments, the control signal provided from the camera module controller 1216 to each of the camera modules 1100a, 1100b, and/or 1100c, etc., may include a sync enable signal, but is not limited thereto. For example, when the camera module 1100b is the master camera and the camera modules 1100a and 1100c are the slave cameras, the camera module controller 1216 may transmit the sync enable signal to the camera module 1100b, etc. The camera module 1100b receiving the sync enable signal may generate a sync signal based on the provided sync enable signal and provide the generated sync signal to the camera modules 1100a and 1100c through a sync signal line SSL, etc. The camera module 1100b and the camera modules 1100a and 1100c may be synchronized with such a sync signal to transmit the image data to the application processor 1200, etc.

In some example embodiments, the control signal provided from the camera module controller 1216 to the plurality of camera modules 1100a, 1100b, and/or 1100c, etc., may include mode information according to and/or based on the mode signal. Based on the mode information, the plurality of camera modules 1100a, 1100b, and/or 1100c, etc., may operate in a first operation mode and/or a second operation mode, etc., (e.g., a plurality of operation modes) in relation to a sensing speed of the camera modules.

The plurality of camera modules 1100a, 1100b, and/or 1100c, etc., may generate an image signal at a first speed (e.g., generate the image signal at a first frame rate) in the first operation mode, encode the image signal at a second speed (e.g., encode the image signal at a second frame rate higher than the first frame rate) higher than the first speed, and transmit the encoded image signal to the application processor 1200, but the example embodiments are not limited thereto. In this case, the second speed may be 30 times or less of the first speed, but is not limited thereto.

The application processor 1200 may store the received image signal, that is, the encoded image signal, in the internal memory 1230 included therein and/or the external memory 1400 outside (e.g., external to) the application processor 1200, and then, may read and decode the encoded image signal from the internal memory 1230 and/or the external memory 1400 and may display image data generated based on the decoded image signal, but the example embodiments are not limited thereto. For example, a corresponding one of the sub-image processors 1212a, 1212b, and/or 1212c, etc., of the image processing device 1210 may perform the decoding and may also perform image processing on the decoded image signal, etc.

In the second operation mode, the plurality of camera modules 1100a, 1100b, and/or 1100c, etc., may generate an image signal at a third speed lower than the first speed (e.g., at a third frame rate lower than the first frame rate) and transmit the image signal to the application processor 1200, but are not limited thereto. The image signal provided to the application processor 1200 may be an unencoded signal, but is not limited thereto. The application processor 1200 may perform image processing on the image signal and/or store the image signal in the internal memory 1230 and/or the external memory 1400, etc.

The PMIC 1300 may supply power, such as a power voltage, to each of the plurality of camera modules 1100a, 1100b, and 1100c, etc. For example, the PMIC 1300 may supply first power to the camera module 1100a through a power signal line PSLa, supply second power to the camera module 1100b through a power signal line PSLb, and supply third power to the camera module 1100c through a power signal line PSLc under the control of the application processor 1200, but the example embodiments are not limited thereto.

The PMIC 1300 may generate power corresponding to each of the plurality of camera modules 1100a, 1100b, and 1100c, etc., in response to a power control signal PCON from the application processor 1200, and may also adjust a power level of the generated power. The power control signal PCON may include a power adjustment signal for each operation mode of the plurality of camera modules 1100a, 1100b, and/or 1100c, etc. For example, the operation mode may include a low power mode, and in this case, the power control signal PCON may include information about a camera module operating in a low power mode and a set power level, but the example embodiments are not limited thereto. Levels of powers provided to the plurality of camera modules 1100a, 1100b, and/or 1100c, etc., may be the same as or different from each other. Also, the power level may be dynamically changed.

While various example embodiments of the inventive concepts have been particularly shown and described with reference to the figures, it will be understood that various changes in form and details may be made therein without departing from the spirit and scope of the following claims.

What is claimed is:

1. An image sensor comprising:
   a pixel array including an active pixel and an optical black pixel, the active pixel configured to generate a first pixel signal, and the optical black pixel configured to generate a second pixel signal;
   a first biasing circuit configured to bias the first pixel signal based on a first bias voltage;
   a first analog-to-digital converter configured to convert the biased first pixel signal into a first digital signal;
   a second biasing circuit configured to bias the second pixel signal based on a second bias voltage, a value of the second bias voltage being different than a value of the first bias voltage; and
   a second analog-to-digital converter configured to convert the biased second pixel signal into a second digital signal.

2. The image sensor of claim 1, wherein the second biasing circuit has a transconductance less than the first biasing circuit.

3. The image sensor of claim 1, wherein the first analog-to-digital converter has a random noise bandwidth equal to the second analog-to-digital converter.

4. The image sensor of claim 1, wherein
   the first analog-to-digital converter is further configured to,
      compare the biased first pixel signal to a ramp signal; and
   the second analog-to-digital converter is further configured to,
      compare the biased second pixel signal to the ramp signal.

5. The image sensor of claim 4, wherein the second analog-to-digital converter has a capacitance greater than the first analog-to-digital converter.

6. The image sensor of claim 4, wherein the second analog-to-digital converter has a bias driving current greater than the first analog-to-digital converter.

7. The image sensor of claim 4, wherein the second analog-to-digital converter has a physical size greater than the first analog-to-digital converter.

8. The image sensor of claim 1, wherein
   the first biasing circuit includes at least one first switching device;
   the second biasing circuit includes at least one second switching device;
   the first switching device has a width and length equal to the second switching device; and
   the first biasing circuit includes a different number of first switching devices than a number of second switching devices included in the second biasing circuit.

9. The image sensor of claim 8, wherein the number of second switching devices included in the second biasing circuit is greater than the number of first switching devices included in the first biasing circuit.

10. An image sensor comprising:
    a pixel array including an active region and an optical black region, the active region including a plurality of active pixels arranged in a matrix, and the optical black region including a plurality of optical black pixels arranged in a matrix;
    a first biasing circuit connected to each column line of a plurality of column lines of the active region, and the first biasing circuit configured to bias a first pixel signal generated from at least one active pixel of the plurality of active pixels of a connected column line based on a first bias voltage;
    a first analog-to-digital converter connected to each column line of the plurality of column lines of the active region, and the first analog-to-digital converter configured to convert the biased first pixel signal into a first digital signal;
    a second biasing circuit connected to each column line of a plurality of column lines of the optical black region, and the second biasing circuit configured to bias a second pixel signal generated from at least one of the plurality of optical black pixels of the connected column line based on a second bias voltage, a value of the second bias voltage being different than a value of the first bias voltage; and
    a second analog-to-digital converter connected to each column line of the plurality of column lines of the optical black region, and the second analog-to-digital converter configured to convert the biased second pixel signal into a second digital signal.

11. The image sensor of claim 10, wherein the second biasing circuit has a transconductance less than the first biasing circuit.

12. The image sensor of claim 10, wherein the first analog-to-digital converter has a random noise bandwidth equal to the second analog-to-digital converter.

13. The image sensor of claim 10, wherein
    the first analog-to-digital converter is further configured to,
       compare the biased first pixel signal to a ramp signal; and
    the second analog-to-digital converter is further configured to,
       compare the biased second pixel signal to the ramp signal.

14. The image sensor of claim 13, wherein the second analog-to-digital converter has a capacitance greater than the first analog-to-digital converter.

15. The image sensor of claim 13, wherein the second analog-to-digital converter has a bias driving current greater than the first analog-to-digital converter.

16. The image sensor of claim 10, further comprising:
    a correction circuit configured to correct the first digital signal based on the second digital signal.

17. The image sensor of claim 16, wherein
    the first analog-to-digital converter is further configured to output a plurality of first digital signals based on a plurality of biased first pixel signals;
    the second analog-to-digital converter is further configured to output a plurality of second digital signals based on a plurality of biased second pixel signals; and
    the correction circuit is further configured to,
       subtract an average of the plurality of second digital signals from each of the plurality of first digital signals.

18. An image sensor comprising:
    a ramp signal generator configured to generate a ramp signal;
    a pixel array including an active region and an optical black region, the active region including a plurality of active pixels arranged in a matrix, and the optical black region including a plurality of optical black pixels arranged in a matrix;
    a first analog-to-digital converter connected to each column line of a plurality of column lines of the active region and the ramp signal generator, and the first analog-to-digital converter configured to convert at least one first pixel signal generated from at least one active pixel of the plurality of active pixels of a connected column line into at least one first digital signal based on a first bias voltage;
a second analog-to-digital converter connected to each column line of a plurality of column lines of the optical black region and the ramp signal generator, the second analog-to-digital converter configured to convert at least one second pixel signal generated from at least one optical black pixel of the plurality of optical black pixels of the connected column line into at least one second digital signal based on a second bias voltage, a value of the second bias voltage being different than a value of the first bias voltage;
a correction circuit configured to correct the first digital signal based on the second digital signal; and
an output buffer configured to output the corrected first digital signal as image data.

19. The image sensor of claim 18, wherein the second pixel signal has less random noise than the first pixel signal.

20. The image sensor of claim 18, wherein
the first analog-to-digital converter is further configured to,
compare the first pixel signal to the ramp signal; and
the second analog-to-digital converter is further configured to,
compare the second pixel signal to the ramp signal, and
be driven with a bias current greater than a bias current driving the first analog-to-digital converter.

* * * * *